(12) United States Patent
Antonysamy

(10) Patent No.: US 8,983,983 B2
(45) Date of Patent: Mar. 17, 2015

(54) STATE OPERATING SYSTEM

(75) Inventor: Amalraj Antonysamy, Palo Alto, CA (US)

(73) Assignee: Network State, LLC, Palo Alto, CA (US)

( * ) Notice: Subject to any disclaimer, the term of this patent is extended or adjusted under 35 U.S.C. 154(b) by 1112 days.

(21) Appl. No.: 12/916,409

(22) Filed: Oct. 29, 2010

(65) Prior Publication Data

US 2011/0270855 A1 Nov. 3, 2011

Related U.S. Application Data

(60) Provisional application No. 61/301,331, filed on Feb. 4, 2010.

(51) Int. Cl.
*G06F 17/30* (2006.01)

(52) U.S. Cl.
CPC .............................. *G06F 17/30179* (2013.01)
USPC ........... 707/756; 707/722; 707/736; 707/758; 706/12; 706/14; 706/45

(58) Field of Classification Search
None
See application file for complete search history.

(56) References Cited

U.S. PATENT DOCUMENTS

| | | | |
|---|---|---|---|
| 5,542,078 A | 7/1996 | Martel et al. | |
| 5,613,122 A | 3/1997 | Burnard et al. | |
| 5,838,965 A | 11/1998 | Kavanagh et al. | |
| 5,864,843 A | 1/1999 | Carino, Jr. et al. | |
| 6,128,668 A | 10/2000 | Barber et al. | |
| 6,529,948 B1 | 3/2003 | Bowman-amuah | |
| 6,708,166 B1 | 3/2004 | Dysart et al. | |
| 7,007,034 B1 | 2/2006 | Hartman, Jr. et al. | |
| 7,028,057 B1 | 4/2006 | Vasudevan et al. | |
| 7,130,863 B2 | 10/2006 | Diab | |
| 7,234,146 B1 | 6/2007 | Cheung | |
| 7,296,037 B1 | 11/2007 | Kruy et al. | |
| 7,340,481 B1 | 3/2008 | Baer et al. | |
| 7,356,766 B1 | 4/2008 | Baer et al. | |
| 7,421,458 B1 | 9/2008 | Taylor et al. | |
| 7,444,363 B2 | 10/2008 | Kruy et al. | |
| 7,467,373 B2 | 12/2008 | Pepin et al. | |
| 7,552,135 B2 | 6/2009 | Iyer et al. | |
| 7,603,675 B2 | 10/2009 | Cheung | |
| 7,624,075 B2 | 11/2009 | Lucco et al. | |
| 7,627,541 B2 | 12/2009 | Lucco et al. | |
| 7,647,417 B1 | 1/2010 | Taneja | |
| 7,774,295 B2 | 8/2010 | Middelfart et al. | |
| 7,809,763 B2 | 10/2010 | Nori et al. | |
| 7,827,558 B2 * | 11/2010 | Chang | 718/104 |
| 7,836,028 B1 | 11/2010 | Agarwal et al. | |
| 7,945,541 B1 | 5/2011 | Schendel et al. | |
| 8,037,333 B2 * | 10/2011 | Belt et al. | 713/323 |
| 8,166,288 B2 * | 4/2012 | Sancho-Dominguez et al. | 713/2 |
| 8,176,294 B2 * | 5/2012 | Frank | 711/202 |
| 8,381,032 B2 * | 2/2013 | Burn et al. | 714/19 |
| 2004/0024753 A1 | 2/2004 | Chane et al. | |

(Continued)

FOREIGN PATENT DOCUMENTS

| | | |
|---|---|---|
| EP | 1030250 A1 | 8/2000 |
| WO | WO 00/43916 A2 | 7/2000 |

*Primary Examiner* — Hung Le
(74) *Attorney, Agent, or Firm* — Law Office of Stephen J. LeBlanc

(57) ABSTRACT

Methods and systems for distributed data storage provide automatically expandable and configurable state servers and a state operating system for storing data closer to its natural format.

21 Claims, 13 Drawing Sheets

(56) References Cited

U.S. PATENT DOCUMENTS

| | | |
|---|---|---|
| 2004/0230616 A1 | 11/2004 | Kruy et al. |
| 2006/0085336 A1 | 4/2006 | Seubert et al. |
| 2006/0248128 A1 | 11/2006 | Acharya et al. |
| 2009/0198655 A1* | 8/2009 | Kim et al. ............... 707/3 |
| 2009/0216811 A1* | 8/2009 | Manczak et al. ......... 707/201 |
| 2010/0138691 A1* | 6/2010 | Kumar et al. ............ 714/6 |
| 2010/0312608 A1* | 12/2010 | Shan et al. .............. 705/10 |
| 2011/0061045 A1* | 3/2011 | Phillips ................... 717/173 |
| 2011/0145526 A1* | 6/2011 | Parham et al. ........... 711/162 |
| 2012/0013795 A1* | 1/2012 | Belt et al. ................ 348/441 |
| 2012/0054748 A1* | 3/2012 | Fultheim et al. ......... 718/1 |
| 2013/0166951 A1* | 6/2013 | Burn et al. ............... 714/19 |

* cited by examiner

```xml
<MediaInfo>
<FileInfo>
<Application>Windows Movie Maker 6.0.6000.16386</Application>
<Title></Title>
<Author></Author>
<Copyright></Copyright>
<Description></Description>
<FileId>229c72d1-1573-4101-9a61-b58652b07cc9</FileId>
<FileSize>336604395</FileSize>
<CreationDate>2009-04-07T15:19:24.9-07:00</CreationDate>
<DataPackets>42074</DataPackets>
<PlayDuration>PT18M0.455S</PlayDuration>
<SendDuration>PT17M55.907S</SendDuration>
<PreRoll>5000</PreRoll>
<IsBroadcast>false</IsBroadcast>
<IsSeekable>true</IsSeekable>
<MinimumDataPacketSize>8000</MinimumDataPacketSize>
<MaximumDataPacketSize>8000</MaximumDataPacketSize>
<MaximumBitrate>2513826</MaximumBitrate>
<Language>en-us</Language>
<StreamIndex="1"Type="Audio">
<DataBitrate>96000</DataBitrate>
<BufferSize>5000</BufferSize>
<NumberOfChannels>2</NumberOfChannels>
<BytesPerSecond>12000</BytesPerSecond>
<BitsPerSample>16</BitsPerSample>
</Stream>
<StreamIndex="2"Type="Video">
<DataBitrate>2395000</DataBitrate>
<BufferSize>5000</BufferSize>
<Width>640</Width>
<Height>480</Height>
<BitsPerPixel>24</BitsPerPixel>
</Stream>
<CodecType="Audio">
<Name>Windows Media Audio 9.2</Name>
<Description>96 kbps, 48 kHz, stereo (A/V) 1-pass CBR</Description>
</Codec>
<CodecType="Video">
<Name>Windows Media Video 9</Name>
<Description>Professional</Description>
</Codec>
</FileInfo>
<Title>The Future of SQL Data Services with Nigel Ellis</Title>
<Description>
<Paragraph>
    I had the pleasure of sitting down with one of SQL Server's brightest,
    Nigel Ellis, to discuss the future direction of SQL Data Services.  Nigel goes
    deep on the changes of SDS. If you want to learn whats really going on behind
    the scenes this is a great place to start.
</Paragraph>
</Description>
<Keywords>SQL,dataservices,Nigel</Keywords>
<DatePublished>2009-04-20T18:01:00-08:00</DatePublished>
<Author>Ron Jacobs</Author>
</MediaInfo>
```

*FIG. 8A*

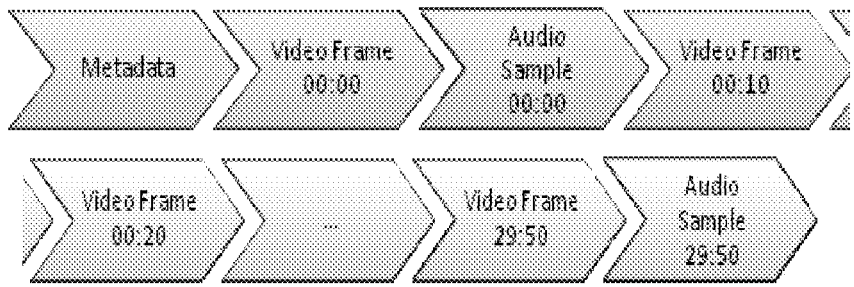
*FIG. 8B*
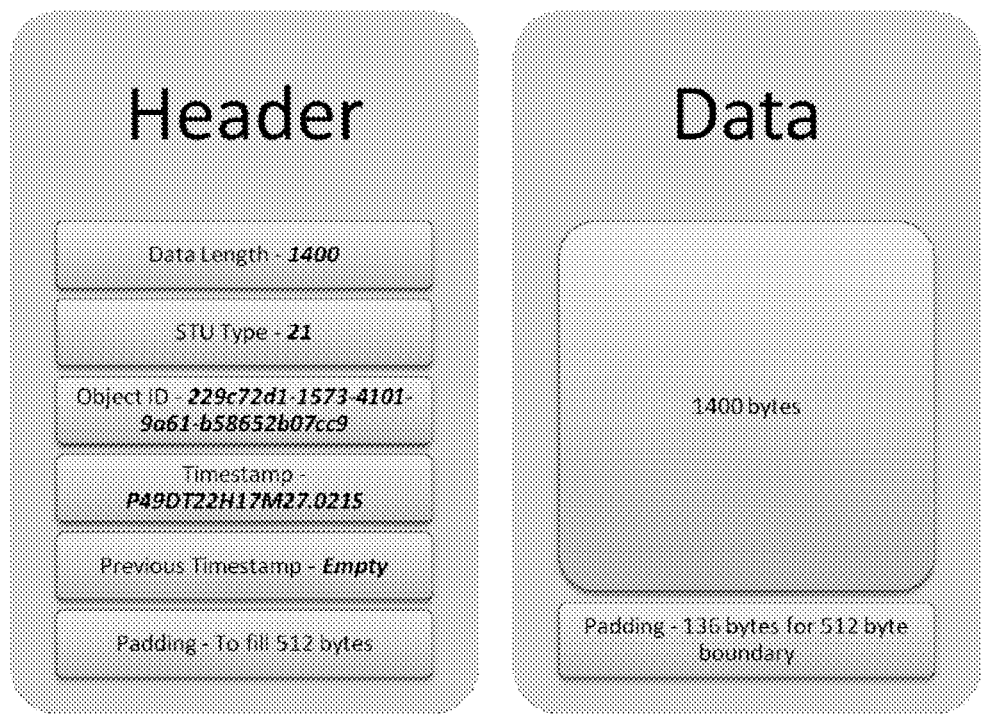
*FIG. 8C*
```
<CommandType="Add"Node="229c72d1-1573-4101-9a61-b58652b07cc9"
    Timestamp="P49DT22H17M27.021S">
<MediaInfo>
<Entries>....</Entries>
</MediaInfo>
</Command>
```
*FIG. 8D*

```
<CommandType="Add"Node="dedd29ba-506f-4e28-8ed8-a3fec087e4b5"
    Timestamp="P49DT22H17M27.021S">
<PlaylistPlaylistId="dedd29ba-506f-4e28-8ed8-a3fec087e4b5"
    Name="Latest Channel 9 episodes">
<Clip> Name="This Week on C9">
<MediaId>058d5fb7-2dce-4064-a70a-b13f3839ad2b</MediaId>
<StartTime>0</StartTime>
<EndTime>300000</EndTime>
</Clip>
<ClipName="Microsoft Visual Studio: Web Development Futures">
<MediaId>05ca3c21-919e-41a5-b75d-c43c636aab77</MediaId>
<StartTime>100</StartTime>
<EndTime>1000</EndTime>
</Clip>
<ClipName="">
<MediaId>05e1ba62-1863-4bbc-807b-6028b10c05fd</MediaId>
<StartTime>120</StartTime>
<EndTime>790</EndTime>
</Clip>
</Playlist>
</Command>
```

*FIG. 9A*

```
<CommandType="Modify"Algorithm="XmlDiff"Node="dedd29ba-506f-4e28-8ed8-
a3fec087e4b5"
Timestamp="P49DT23H17M27.021S"PreviousTimestamp="P49DT22H17M27.021S">
<CommandType="Delete"Path="Clip[3]" />
<CommandType="Replace"Path="Clip[2]/EndTime"From="1000"To="2000" />
</Command>
```

*FIG. 9B*

```
<CommandType="Add"Node="c3df8dd1-e17e-4a1a-b36d-8c1fdb54ebdc"
      Timestamp="P49DT22H17M27.021S">
<ChannelChannelId="c3df8dd1-e17e-4a1a-b36d-8c1fdb54ebdc">
<Title>Daily financial status prepared for the executive team</Title>
<Type>On Demand</Type>
<Name>finance</Name>
<PlaylistPlaylistId="dedd29ba-506f-4e28-8ed8-a3fec087e4b5"/>
</Channel>
</Command>>
```

STATE OPERATING SYSTEM

CROSS REFERENCE TO RELATED APPLICATIONS

This application claims benefit of priority from provisional application 61/301,331 filed Feb. 4, 2010.

The above referenced documents and application and all documents referenced therein are incorporated in by reference for all purposes.

PRECAUTIONARY REQUEST TO FILE AN INTERNATIONAL APPLICATION, DESIGNATION OF ALL STATES, AND STATEMENT THAT AT LEAST ONE APPLICANT IS A UNITED STATES RESIDENT OR ENTITY

Should this document be filed electronically or in paper according to any procedure indicating an international application, Applicant hereby requests the filing of an international application and designation of all states. For purposes of this international filing, all inventors listed on a cover page or any other document filed herewith are applicants for purposes of all filings. For purposes of any international filing, applicants state that at least one applicant is a United States resident or United States institution.

COPYRIGHT NOTICE

Pursuant to 37 C.F.R. 1.71(e), applicant notes that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to electronic devices and systems. More particularly, it relates to computer systems and applications that provide improved methods for storing and accessing data.

BACKGROUND

Data storage in most personal and enterprise computer systems is generally handled by a file system which generally stores any type of data in a file. Thus, very large data objects, such as movies, and very small data objects, such as a single line of text used as a batch file, are stored similarly, with similar file overhead of a file name, location in a tree structure, modification date, permissions, etc. For small data units, a file system can be inefficient in that the overhead of maintaining all of the files associated information may be excessive and unnecessary. For large data objects, such as a video file, the problem is that the file system provides no way for storing structured data in a file, thus a large file has to be managed as a single monolithic entity and it cannot be split into smaller files or merged into a larger file.

Relational databases were invented when computer memory was measured in KB, and storage space was measured in KB and CPU speed was measured in KHz. Storage was slow, very expensive, consumed lot of space and power, storage access was mostly sequential with inefficient random access. System memory was slow and expensive too. Relational databases, as a data representation technology, were developed to minimize memory, storage and CPU usage.

Relational database technology is generally about creating fixed width containers called tables to store fixed size entities called records each made of fixed size columns Tables have a well-defined static relationship between them, or specifically, one more columns of a table have a relationship to one or more columns of another table. Having fixed size makes locating and reading data easier, for example, to read 3rd column of 4th row, by already knowing the size of a row and column, byte offset is calculated and data is read from that byte offset. Database queries and views are supported by creating temporary tables and pulling values from columns of different tables. While variable length columns are supported, their storage and management are not as optimal as fixed length columns.

When a hierarchical data is translated to flat data like in a relational database, the translation is one way; the focus of this translation is to save storage and processing. So translating back from a relational data to hierarchical data is difficult and sometimes impossible, because a single table may be shared by multiple business objects.

SUMMARY

The present invention in various specific embodiments is involved with novel devices, systems, and methods for storing, retrieving and working with digitally encoded data. The invention involves a new data storage model and system that intrinsically provides distributed, expandable, automatically configurable, and automatically synchronized data storage and retrieval across various sized enterprises. The invention in specific embodiments accomplishes this using several novel methods and systems for data storage and retrieval. Novel methods are provided herein that are directed to data storage and data organization. Novel systems are provided herein that can utilize one or more of the novel methods provided herein to provide data storage.

The invention is described in terms of a number of example novel components. In this description, major components are referred to as (1) State Transformation Units (STUs); (2) Business Objects; (3) State Servers; (4) State Applications; and (5) the State Operating System (State OS). However, aspects of the invention may be embodied in other systems that do not organize their components as described herein or that use a different terminology.

State Transformation Units (STUs)

A fundamental unit of data storage, transport, and organization according to specific embodiments of the present invention is the State Transformation Unit (STU). STUs generally can be of two or more types and can further generally be classified as data STUs and metadata STUs. According to specific embodiments of the invention, STUs modify the state of a business object (discussed below) including the initial creation of a business object. Thus, generally, every STU either creates a new business object or modifies the state of an existing business object. STUs themselves are not be modified and are read only. If the effects of an STU needs to be reversed, a new STU is created. According to specific embodiments of the invention, the immutability of STUs creates freedom of storage, this enables STUs to be copied anywhere in the enterprise network without a worry about synchronization and increases the scalability of the State OS. STUs generally are self identifiable, with each generally including the business object ID to which is applies, and a timestamp, an the timestamp of the preceding STU. One STU does not become a part of another STU, each one is independent. There is generally no dependency hierarchy for STUs, though the order of STUs may be used to efficiently recreate a business object.

STUs are structured and created according to a predefined header format. According to specific embodiments of the invention, STUs have a fixed length header and a variable length body. The header includes the type of the STU, an ID of the business object, this STU's time stamp, the timestamp of the STU before this one (the preceding timestamp), possibly GUID of the user creating this STU, size of the data portion of this STU, and optionally additional type-specific information. In one example, each header is 512 bytes long. The data portion of an STU can vary from zero bytes to some convenient upper limit determined by the system, e.g., 100 Mbytes, 1 Gigabyte, or 4 Gigabytes.

According to specific embodiments of the invention, STUs are the fundamental unit of data handled by the core functions of the State OS. Generally, STUs are the unit of data stored, synchronized, and transmitted by the core State OS. STUs generally are compiled or processed by state applications into business objects. STUs generally are also created by state applications from various data handled by the state applications.

Business Objects

From a user's perspective, a business object is the unit of data stored by a system of the present invention. A business object can be relatively small, such as a data entry form, or can be large, such as a movie. A business object has metadata, which is a list of properties of that business object, and additional data. For example, a movie has metadata like movie producer's name and director's name and additional data that are video frames and audio samples. Some business objects have only metadata; they don't have additional data. As an example, a movie playlist which a list of movies with their start and end time can be represented as metadata, it has no additional data. Business objects are decomposed into metadata STUs and optionally data STUs, generally by a state application that handles those business objects, possibly with the use of middleware or system functions provided by the State OS. Business objects exist in the working memory (or cached working memory) of a state server of the invention, which is referred to as the business object cache. Business objects generally are not stored on permanent storage, except as their constituent STUs. A business object can be recreated by processing its associated STUs one after another in the specified order. Each STU specifies the timestamp of the STU for which it is applying a change. This timestamp is called the preceding timestamp. The first STU of a business object generally creates the business object and does not have a preceding timestamp. STUs of a business object can be summarized wherein a new STU can be created to replace other STUs preceding it. This new STU would generally copy the preceding timestamp from the oldest STU for which it was summarizing changes (or no preceding timestamp for an STU summarizing changes of all other STUs for a business object.)

Generally while STUs belong to the core State OS, business objects belong to applications running in a state server. Implementation of the business object cache is generally left to the applications. When the core OS receives STUs either from other state servers or from local storage, it sends them to the corresponding state application based on the STU type (applications may run in the same process as the core OS, so communication between core OS and applications could be just direct function calls). The core OS also maintains a cache of metadata STUs (which may cache the contents of the STU data), and data STUs (which are pointers to disk offset).

A business object is uniquely identified by its GUID and its latest timestamp. This timestamp implies all the preceding STUs have been applied to the business object. When two business object differ only by their timestamp, the one with the latest timestamp is the more current. According to specific embodiments of the invention, timestamps can be used different contexts, application level, STU type level, business object level. At each context, synchronized up to a timestamp means all previous time stamped objects are applied/available.

State Servers

According to specific embodiments of the invention, storage of STUs, creation of business objects, and communications between state servers and clients is handled by information processing systems referred to herein as state servers. State servers can be understood as a suite of software implementing the components as described herein and can also be understood according to specific embodiments of the invention as a specific machine or computer system. A state server generally includes state application software to compose and decompose business objects into STUs, State OS storage software to store STUs, State Network software to transmit and receive STUs to and from other state servers in the enterprise, software implementing the APIs used by clients to access the business objects, and system software to synchronize the state of one state server with other state servers.

A state server according to specific embodiments is typically run on a single hardware device, which can be a general purpose computer (e.g., a workstation or PC) or a special purpose computer (e.g., a network server, or a computer system built specifically to act as a state server). But in some configurations a single state server software instance can run on multiple devices connected to a local high speed network. And reversely, there could be two or more instances of state server software running on a single machine. Typical example state server hardware would have 16+ gigabytes of RAM, 8+ cores of CPU, 5+ terabytes of storage, 2 or more gigabit network adapters. Depending on usage, it could also have a GPU video adapter to improve graphics and media coding performance.

State servers are generally expected to be located close to users, away from a central location like a data center. Since it is at the edges, they would be located along with the network switches like an Ethernet switch. Because of this architecture an enterprise generally will install multiple state servers. A small enterprise may have 10 state servers and a large multi-national enterprise can have 1000s of state servers.

The primary goal of state servers is to replace or supplement centralized data centers. To make this practical, the state servers generally are no more difficult to implement and operate than a central data center. To achieve this, a network of state servers is architected to run as a single virtual device, and this device hides the complexity of multiple servers. According to specific embodiments of the invention, this device is understood and referred to as an instance of the state operating system (State OS)

Because of the properties of business objects and STUs as discussed above, storage of data according to specific embodiments of the invention can be very efficient. STUs generally are stored at or near the lowest convenient level of organization of the physical storage system available at a particular state server. In a disk drive, for example, STUs are stored as sequential clusters, and one STU is stored right after another. This provides a number of advantages over other storage systems, such as file systems, which are discussed further below.

The State Operating System (State OS)

According to specific embodiments, the State OS comprises software components that virtualize a collection of state servers as a single information device. In a State OS, the operating system as installed on each individual state server works together to present to users an instance of a state server that can be treated as a single computer. Each state server of the State OS is analogous to separate CPUs or processors of a multiprocessor computer system. State servers are generally symmetrical in that users get the same data no matter which state server they connect to. As far as users are concerned, each state server is a gateway to a virtual central data store, or, in other words, to the entire State OS. In specific embodiments, state servers are automatically synchronized and are connected to every other state server either directly or indirectly through other state servers. They are connected through two kinds of connection, one is a signaling connection optimized for sending short messages, and another is a data connection optimized for sending large amounts of data.

State Applications

In addition to the above four components, systems according to specific embodiments will have additional components to provide the distributed storage services as described herein. According to specific embodiments of the invention, the State OS hosts and runs state applications. For example, a Media Server application can be installed on top of a State OS. Once installed, such an application generally is available to any user connecting to the State OS through any state server. While state applications and their functions are described herein as somewhat distinct from the state OS, some or all of the functions discussed for state applications could be incorporated into the state OS according to specific embodiments of the invention. Incorporating application functions into an operating system is well understood in the art. However, in specific embodiments, the state OS is designed to be able to have new or modified applications installed to accommodate various user needs.

Network, Gateway, Middleware, and Workflow

Other applications or State OS components provide additional services. Gateway applications connect State OS with other standard and legacy interfaces, for instance an RTSP server as a gateway application interfaces with standard media players to play videos. Gateway Applications typically run on separate computers outside of the State OS. In one example, a gateway application might be an application running in windows that allows users to access business objects on the State OS, for example as though those objects were windows media files on a standard network data server.

In further embodiments, a new network protocol, at times herein referred to as the State Exchange Protocol (STX), is incorporated into the State OS. This protocol generally separates signaling from data. A signaling channel carries messages and a data channel carries bulk data. A signaling channel is semi-permanent, created when state servers come online and stays active during state server operation; data channels are temporary, valid only for the duration of data transfer. State servers according to specific embodiments of the invention constantly synchronize metadata STUs, which contain business object metadata, network status, server status, client status, state application status and many other things, and this constant data traffic in specific embodiments is handled using a dedicated network connection reaching all servers. A signaling channel is optimized for sending messages, which are short. In specific embodiments, many of the messages may be combined into a single large payload.

According to specific embodiments, the present invention is involved with methods and/or systems and/or devices that can be used together or independently for data storage in computer systems. Various known digital data media protocols and formats, such as HTTP, RTTP, XML, HTML, dHTML, VRML, RTSP, as well as other image, audio, or video formats are used in specific example embodiments. However, using the teachings provided herein, it will be understood by those of skill in the art that the methods and apparatus of the present invention could be advantageously used in other related situations where users access data or media over a communication channel or digital system.

Software Implementations

Various embodiments of the present invention provide methods and/or systems for data storage that can be implemented on a general purpose or special purpose information handling appliance using a suitable programming language such as Java, C++, Cobol, C, Pascal, Fortran, PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. Specific dimensions or values are provided herein for descriptive purposes only are should not be take to limit the invention.

All references, publications, patents, and patent applications cited herein are hereby incorporated by reference in their entirety for all purposes.

BRIEF DESCRIPTION OF THE DRAWINGS

FIG. 8A-E are diagrams and XML code illustrating a movie business object according to specific embodiments of the present invention.

FIG. 9A-D are diagrams and XML code illustrating a playlist and a channel business object according to specific embodiments of the present invention.

DESCRIPTION OF SPECIFIC EMBODIMENTS

Figure 1:
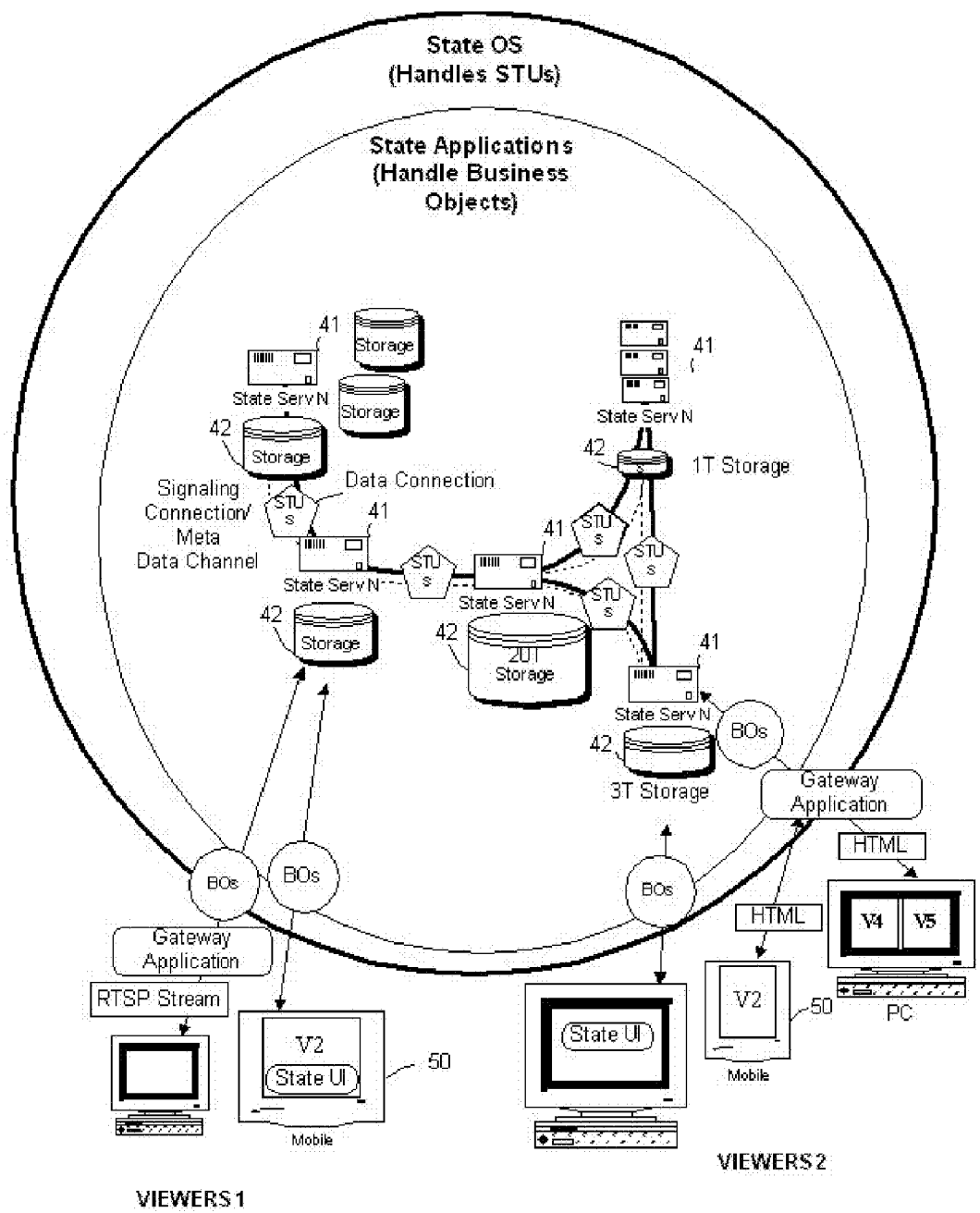
FIG. 1 is a diagram illustrating a state operating system, five representative state servers, and five representative client users according to specific embodiments of the present invention.
Figure 2:
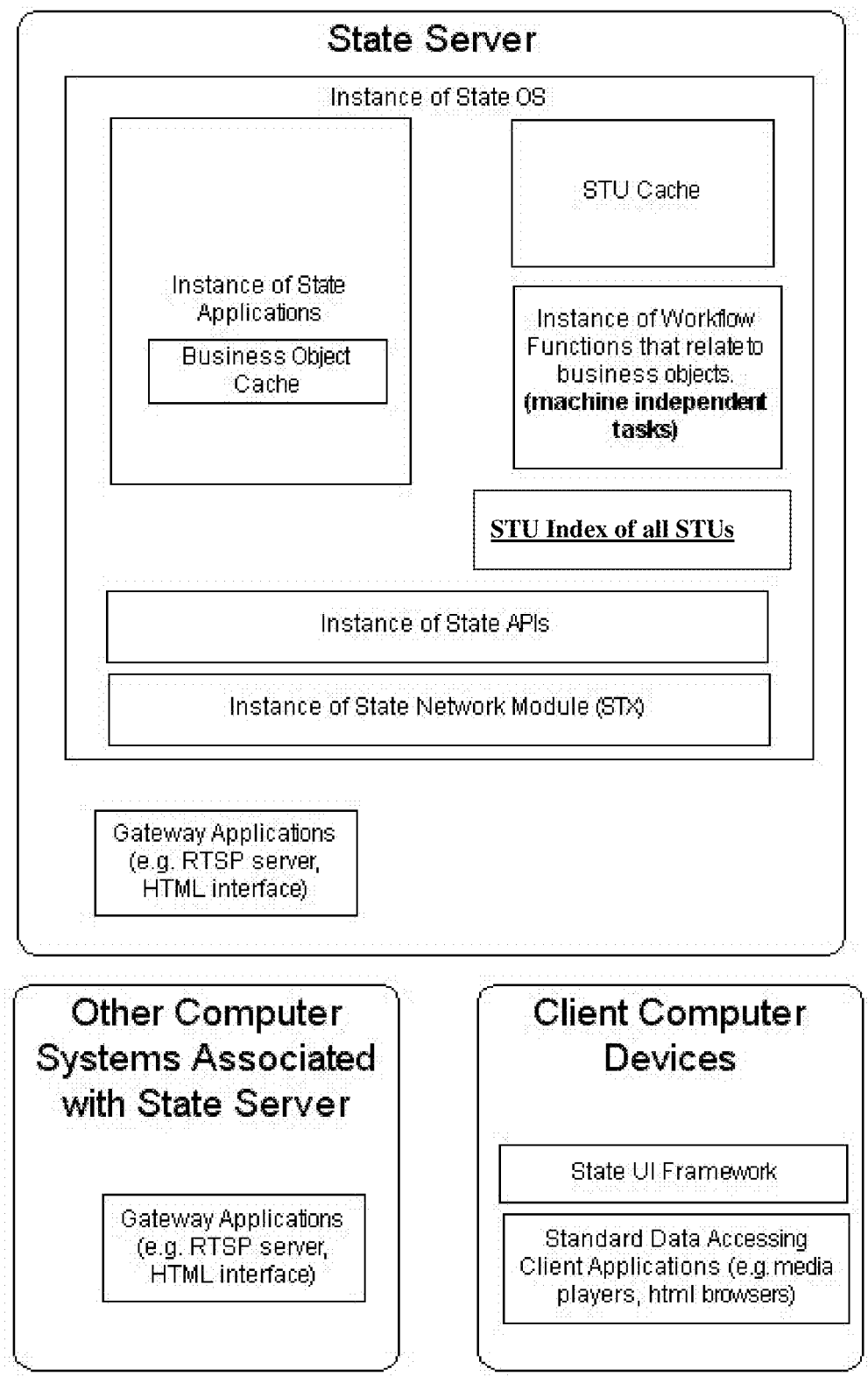
FIG. 2 is a diagram illustrating summary operating components of a state server according to specific embodiments of the present invention.

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, technical and scientific terms used herein have meanings as commonly understood by one of ordinary skill in the art to which the invention pertains. Although any methods and materials similar or equivalent to those described herein can be used in practice or for testing of the present invention, the preferred materials and methods are described herein.

GLOSSARY

In describing and claiming the present invention, the following terminology will be used generally in accordance with the definitions set out below. These definitions shall not be take to limit other understandings of these terms consistent with the description provided herein.

State Server—A network device that runs the networking, storage, workflow and API modules of State OS.

State OS—A networked collections of state servers in an enterprise and/or the software modules and logic routines running on state servers that allow them to function cooperatively as described herein.

State Applications—One or more software modules, running on each state server, to provide specific data storage and retrieval functions. A state media server application, for example, handles media data. A state order processing application handles order processing data. A state reservations application handles tickets or reservations for entertainment events, airline flights, etc. A state income tax application handles income tax data. Each of these applications may have very different structures for business objects, but unified data handling is providing by decomposing these different business objects into STUs.

State Storage—The storage component that run on each state server of State OS.

State Networking—The networking component that connects the state servers of State OS.

State Workflow—The module that implements workflow operations in the distributed operating system.

State API—The module that connects clients with State OS.

State UI—The user interface component of State OS.

State Gateway—The component that bridges existing services with State OS.

STU—State transformation unit, information to change or create a business object.

DETAILED DESCRIPTION

Business Objects and State Transformation Units

According to specific embodiments of the invention, a business object can be anything that can be quantified or measured and is represented by state applications in any desired data format, generally one as close as possible to its natural data format, but it is split into read only parts, which are generally referred to as state transformation units (STUs). The parts of a business object are independent and read only; they can be replicated to multiple data servers without the need for an individual STU to be kept synchronized. Thus the invention increases scalability while reducing complexity. Because business objects are represented closer to their natural format or a convenient format, data applications like data mining, data analysis and report generation can be much easier to write: state application can retrieve and deliver the business data not as a file or a particular field, but in any form desired by the application.

State Transformation Units (STUs)

As described above, once created STUs are read only and immutable. If the effects of an STU, which means the changes in the business objects, need to be reversed, a new STU is created with the reverse properties. Immutability creates freedom of storage, this enables STUs to be copied anywhere in the enterprise network and not have to worry about synchronized access. Contrast this with a database; a copy of a database table becomes invalid as soon as a change is made in the original table. This affects the scalability of a database, while immutability of a STU dramatically increases the scalability of the State OS.

STUs are generally self-identifiable and independent. Each STU has identifying information like the business object id and timestamp. One STU doesn't become a part of another STU. This feature is important because one can copy an STU without copying another set of STUs to go with it. While the order of STUs is important to recreate a business object, an STU storage system wouldn't have to bother about the business object dependencies. The storage system generally only handles STUs.

Figure 5:
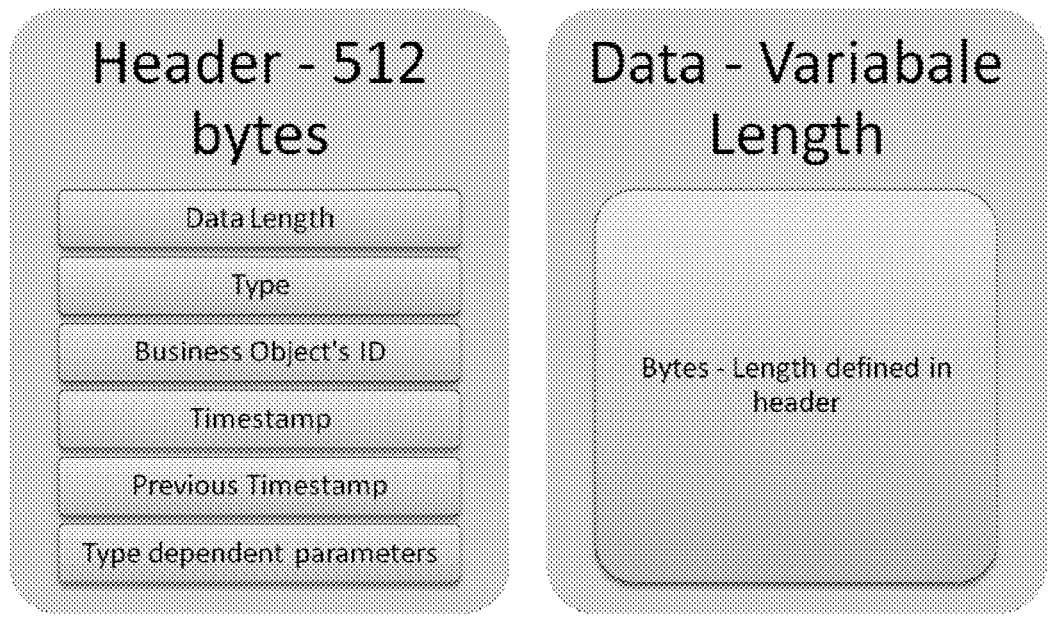
FIG. 5 is a block diagram illustrating a state transformation unit according to specific embodiments of the present invention.

FIG. 5 is a block diagram illustrating a state transformation unit according to specific embodiments of the present invention. STUs generally have a fixed length header and a variable length body. The header includes the type of the STU, business object's id, this STU's time stamp, timestamp of the STU before this one, GUID of the user creating this STU, size of the data portion of this STU and additional type specific information. In one example embodiment, each header is 512 bytes long and has room for additional type specific information. In an alternate example, a header can be 1024 or 2048 bytes. In some embodiments, headers may be of more than one size. For example, an STU for video frames would include the starting time and duration of the video frame in the header. The data portion of an STU can vary from zero bytes to 4 GB, although practically it is limited to 100 MB. A business object can be recreated by processing its associated STUs one after another, where each STU specifies the timestamp of the STU for which it is applying a change. This timestamp is called preceding timestamp. The first STU of a business object doesn't have a preceding timestamp. STUs of a business object can be summarized, thus a new STU can be created to replace other STUs preceding it, and this STU doesn't have a preceding timestamp. In one embodiment, this is the number of milliseconds since a predetermined time, for example Jan. 1, 2010 00:00 hours. All STUs are uniquely identified by the business object ID and time stamp and optionally also type, which means no two STUs of a business object can have the same type and timestamp. The state servers in a State OS are synchronized to a common clock, so the timestamps are expected to be unique. Any collision in time stamps is resolved by recreating the STU with another time stamp. Time stamps can also be considered as version numbers, since applying the STUs create a new version of the business object. STUs as read from storage or received from other state servers are passed to the corresponding application running in the state server, so that the application can update or create the corresponding business object. Since STUs should be passed to applications in the right sequence, any STU read or received out of sequence should be held in a cache and reassembled before passing to an application.

In some applications, state OS, being a distributed system, lets users access and modify a business object at the same time using different state servers. This introduces a problem where two users submit incompatible changes to a business object. An STU that is created to represent the change carries a timestamp of its own and the timestamp of the STU it is modifying (the preceding STU). So when two users modify the same business object at around the same time, thus creating a collision, there would be two STUs seen in the State OS system with the same preceding timestamp. Thus collisions are identified and such collisions should trigger collision resolution protocols.

For some business objects and in some situations collisions can be successfully resolved, in such cases collisions may be allowed to occur. For an application to reserve a concert ticket, as long as there are sufficient number of tickets available, collisions can be avoided by accepting and applying all the colliding changes and creating a summary STU that combines all the changes. When there are only a few tickets available, or for an application like an airline seat allocation applications, collisions have to be avoided, and a suitable collision avoidance algorithm is necessary. One such algorithm is to elect one state server to an arbitration server, before a state server propagates an STU to represent a change, it has to obtain a token from the arbitration server, and then submit the change. An arbitration server makes sure only one token is issued for that business object at a time, subsequent requests for the same token would be sent after the first token is responded to. Note that because the state applications generally have control over creation and management of business objects from STUs and creation of new STUs related to business objects, each state application can handle collisions as appropriate for its data.

Since STUs vary in size, it may be not efficient to store or transmit each STU separately, so STUs may just be appended one after another and thus create a large block. This block doesn't have a structure. Since each STU has a known length, STUs can be extracted from these blocks just by forward scanning. There is no need to traverse back and forth to extract STUs from the block.

Types of STUs

According to specific embodiments of the invention, in specific examples, STU's include a type header that provides information to the system in handling the STUs. An example of STU types are provided in the Table below. This listing of types is not limiting. In various embodiments, many different types of STU may be specified. In specific embodiments, users are free to create new types of STU. Generally, the example STU types shown are related to media server application. Out of these types, frame data has data STUs whereas the remaining types have metadata STUs, which are always synchronized. Other applications would generally define additional STU types.

TABLE 1

EXAMPLE STU TYPES FOR MEDIA

| STU Type Name | Type Description |
| --- | --- |
| MediaMetadata | Metadata (XML), |
| MediaFrameData | Binary frame data |
| MediaThumbnail | Binary image file (JPG/GIF), |
| MediaChannel | Channel Info (XML), |
| MediaPlaylist | Playlist Info (XML) |

State Servers and the State OS

Figure 6:
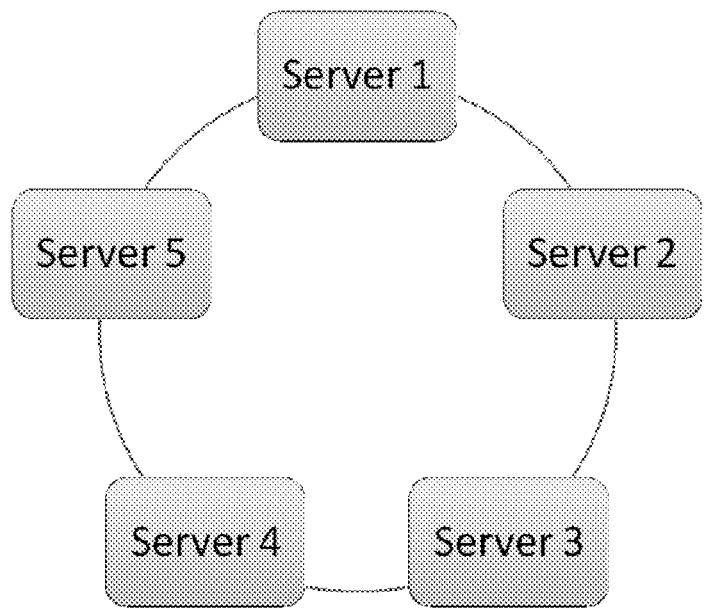
FIG. 6 is a block diagram illustrating a group of cooperating state servers according to specific embodiments of the present invention.

FIG. 6 is a block diagram illustrating a group of cooperating state servers according to specific embodiments of the present invention. According to specific embodiments of the invention, a state server generally includes software to compose and decompose business objects into STUs, software to store STUs, software to transmit and receive STUs to and from other state servers in the enterprise, software implementing the APIs used by clients to access the business objects, the system software to synchronize the state of one state server with other state servers. The software to decompose and composes business objects is at times herein referred to as state applications, such as a media server application or order processing application. These applications may be designed to handle particular types of business objects and STUs appropriate to that application. Applications may also handle only business objects and rely on state OS system calls or state OS middleware to decompose business objects to STU's and recompose STUs to business objects.

A state server according to specific embodiments is typically run on a single hardware device, generally built from a general purpose computer (PC). But in some configurations a single state server software instance could run on multiple devices connected to a local high speed network. And reversely, there could be two or more instances of state server software running on a single machine. Typical example state server hardware would have 16+ gigabytes of RAM, 8+ cores of CPU, 5+ terabytes of storage, 2 or more gigabit network adapters. Depending on usage, it could also have a GPU video adapter to improve graphics performance.

State servers are generally expected to be located close to users, away from a central location like a data center. Since it is at the edges, they would be located along with the network switches like an Ethernet switch. Because of this architecture an enterprise generally will install multiple state servers. A small enterprise may have 10 state servers and a large multinational enterprise can have as many as 1000 state servers.

The primary goal of state servers is to replace or supplement centralized data centers. To make this practical, the state servers generally are no more difficult to implement and operate than a central data center. To achieve this, a network of state servers is architected to run as a single virtual device, and this device hides the complexity of multiple servers. According to specific embodiments of the invention, this device is understood and referred to as an instance of the state operating system (State OS)

According to specific embodiments, as described above, the State OS comprises software components that virtualize a collection of state servers as a single information device. In traditional operating systems, each device has a name and identify and each one is individually accessed and controlled and must be individually managed. Software must be installed individually either manually or via an automated system. In a State OS according to specific embodiments of the invention, individual state servers are not named, users are not allowed to target individual state servers. In a State OS, the operating system instance can be treated as a single computer. Each state server of the State OS is analogous to separate CPUs or processors of a multiprocessor computer system. When users access a computer with multiple CPUs, the users do not target their operations to individual CPUs, they treat them as a single unit. Having multiple CPUs makes a computer powerful but it does not create additional computers. In a similar way, having multiple state servers in a State OS makes the overall system more powerful and able to handle more data, but does not create additional servers.

In specific embodiments of the invention, state servers are symmetrical in that users get the same data no matter which data server they connect to. As far as users are concerned, each state server is a gateway to a virtual central data store, or, in other words, to the entire State OS. However, state servers do not generally have identical capabilities. While state servers are symmetrical, they are not identical in term of storage or capabilities. Each state server may have different physical capabilities, for example, one server may have 2 TB of storage space while another have 200 TB of storage space. It is generally not possible to copy the complete data to each and every state server. The network costs in copying data to every server is so high, it is impractical to do so.

In specific embodiments, state servers are automatically synchronized. Each state server is connected to every other state server either directly or indirectly through other state servers. They are connected through two kinds of connection, one is a signaling connection optimized for sending short messages, another is a data connection optimized for sending large amounts of data. State servers do not synchronize the actual data of business objects; they synchronize the metadata that is the information about business objects with each other. State servers constantly synchronize their information about the network, the client information and other operating parameters of each server. Thus each server has the same picture of the complete State OS.

State servers generally have well-defined boundaries. On one side, state servers connect to other state servers, on the other side they connect to clients. In specific embodiments, this boundary is explicit and clearly defined. The client to state server connection deals with business objects, whereas the state server to state server connection deals with STUs. In specific embodiments, STUs are never sent to clients, and, for example, are as transparent and inaccessible to clients as sectors on a hard drive. In specific embodiments, each state server runs the same suite of software packages all under the same version. Software deployed to one state server is automatically copied to other state servers. There is no client-server relationship among state servers; they all play the same role.

According to specific embodiments of the invention, state servers can be understood as data routers in that in many instances, according to specific embodiments, state servers function somewhat like a network router. State servers don't necessarily originate data; they transport data from one server to another. They are located closer to users, typically along with the network switches. State servers are less visible to end users, their presence is almost invisible. Thus, a user accesses the State OS in a way similar to the user accessing "a network" without the user being aware of the individual systems that host the state OS. State servers are easy to deploy and operate, supporting drop-in installation.

State servers maintain information about business objects and STUs in a working memory. As an example, in a particular example media server implementation, there are separate tables for media metadata, playlists, channels, thumbnails and frame data. As a further example, the metadata table contains two columns, media id (GUID) and an XML document containing information about media. When a state server is started, this table is empty. As STUs are read by the core OS, metadata STUs (the data portion of the STU not headers) are sent to the media server (core OS takes care of timestamp matching, thus sending only in sequence STUs). The media server processes the STU data, in this case STU data is actually the list of changes made to the metadata. New entries are added to the metadata table, changes are applied to existing entries in the metadata table (thus changing metadata). Thus the metadata table always has the latest media information. Playlist and channel tables behave similarly.

The thumbnail table provides a more complex example. It stores the thumbnail data in memory and also in a local file. When a thumbnail is not frequently accessed, the in memory data is discarded.

The frame data table is similar to other tables except that the data is not stored in memory, only the disk offset is stored. This disks offset will be different for each individual state server and there may be different disk offsets for the same STU when the STU is copied multiple times. State servers do not send STUs to clients, they only send business objects to them.

Installation

According to specific embodiments, the State OS can be set to automatically connect to and install or upgrade itself on new state server devices without the need for administrators to individually install operating systems or applications. Generally, according to specific embodiments of the invention, state servers are expected to be packaged as dedicated computers with bootstrap and core State OS applications installed. The bootstrap manager is responsible for making sure all state servers are running at the configured version and monitor the health of core State OS. Bootstrap software is not expected to be updated, but State OS and State applications are updated as needed. In particular embodiments, state servers are expected to run at a tagged version number. This version number is a tag for a list of binary files, both direct executable files and library files (DLLs and EXE files) and a set of configuration files. If these binaries and configuration files are updated in one server, they are copied to other state servers through the signaling channel. They are transferred using 'SoftwareUpdate' messages and binaries are part of this message. The new binaries do not overwrite existing files, each binary has a unique name which includes the version number, so a new file is created. For example, the media server application may be named as networkstate.media.server.1.5.2301.dll. Thus the State OS version number is an identifier that lists all the binaries and configuration files and this list is transferred with the 'SoftwareUpdate' message along with additional information like when the state servers are expected to switch to the new version. The bootstrap application is responsible for shutting down State OS suite of applications and restart them for the new version using the new binaries. In another embodiment of this invention, State OS software can be packaged as a user installable application to be installed on general purpose computer devices.

State Applications

According to specific embodiments of the invention, the State OS hosts and runs applications. For example, a particular State Media Server application can be installed on top of a State OS. Generally, the State OS requires applications to be installed, and the applications share data with clients. State OS is a platform and provides services for applications to use. State OS lets applications store their data and make it automatically transferred to edges of the network. State OS provides its own user interface platform for client applications to use. State OS provides services for gateway applications to connect with existing user interface technologies.

As one example, a State Media Server Application designed to be run on a State OS can host digital media (like video) and stream video to users. The application may let users upload media files in various formats (for example, a Quicktime® or an AVI or MP3 media file) and let any user play the video using a media player (such as Windows Media Player® or Apple Quicktime Player®). For a standard media player to play the video, a media server application running on the State OS can broadcast the media using any protocol known to the player, such as RTSP.

In a state OS, unlike more familiar OS's such as Windows or Unix, the fundamental unit of stored data and of data transmitted between state servers is not a file and is generally not available or exposed to external clients. The fundamental unit is the STU and these STUs have properties, such as described above, that allows them to be distributed and automatically synchronized throughout the state OS. Particular applications running under the state OS, such as the example state media server or state order server applications described above, translate data between the OS level of STUs to the application and user level of business objects.

In specific embodiments, to deploy media servers on top of State OS, two additional modules are used. One is a middleware module that runs on each state server. Its primary job is to track changes in metadata and to track media usage. Media usage reports generated by gateway applications result in changes in media metadata and general enterprise wide statistics. Its also may decompose media files to STUs and assemble them back to media files. These STUs are automatically transported to other state servers as required. Another application or module is a gateway application. It typically runs on separate computers outside of the State OS. In one example, a gateway application might be an application running in windows that allows users to access business objects on the State OS, for example as though those objects were windows media files on a standard network data server. Its job is to bridge traditional users with State OS. For media players, it extracts the media files from a State OS installation as required and converts it to RTSP. To support traditional users, it may have a web user interface for users to upload media files. Thus, using the gateway application, a video file can appear to a user of a windows machine like any other video file stored under windows. When the file is accessed, however, the State OS retrieves the business object as described herein and presents that to the user.

As the second example, consider an ordering or purchasing system, such as an internet shopping site. An ordering system has external users who order products and internal departments who package, bill and deliver them. These external users access the ordering system through web pages, and internal users access it through UI modules built on top of State UI. This ordering system application has three modules that run under or use State OS. First, the workflow module runs on each state server, its primary roles are; compose and decompose order data into STUs, create and manage various tasks for billing, shipping and other departments. Second, the gateway module converts ordering information to web pages, accepting orders from users. This module runs independent of state servers, using state API. Third is a UI module that runs on PCs and mobile devices, it lets internal users to manage tasks related to the order. This module runs on top of State UI Based on the discussion above, we can summarize a State OS to have these components; storage, networking, workflow, UI and API.

Storage

According to specific embodiments of the invention, the State OS includes a storage architecture for storing STUs. Since STUs are variable length and self-identifiable, traditional file systems are not efficient in storing STUs. Thus, the invention uses a new storage mechanism to take advantage of the unique characteristics of STUs. A backup protocol may be used to ensure that STUs are widely distributed. A data discovery protocol is used to locate STUs. A main responsibility of a state server is to store and distribute STUs. In terms of storage, an STU is just a block of memory, or opaque binary data. Each STU is variable length and the length of an STU is embedded in the STU itself. While it may sound efficient to just store each STU as a separate file using a standard file system, according to specific embodiments of the invention, an improved storage mechanism stores STUs directly on storage medium without using an intermediate layer like a file system. This means, to store STUs in a hard disk, the disk may be partitioned into multiple partitions and STUs are stored directly on those partitions. As discussed above, STUs have unique characteristics, they are immutable and they are dispensable meaning STUs once written are not modified again; STUs can just be discarded when additional space is required. Thus, according to specific embodiments, the invention involves a very simple storage architecture: STUs are written one after another until the end of storage media, after reaching the end writing wraps around and continues from the beginning. In one embodiment of this invention, large disks are split into data partitions, writing starts at the first partition, then generally goes on to the next partition when this partition is full and so on until the last partition. After the last partition is full, writing moves back to the first partition and does this all over again. Once a STU written to storage, it is not modified, it would be deleted when disk space needs to be reclaimed. File system caching is generally disabled, which means STUs are written to disk partitions directly with no copying of data to system memory in between. State OS systems can optionally store large data STUs in a separate section of storage from metadata STUs.

According to specific embodiments of the invention, when a state server comes online, it reads and processes all the STUs in its storage. This processing depends on the type of STUs. Metadata STUs are read completely and processed into business objects or partial business objects and they generally are not read again because their data is retained in the state server's business object cache as long as the state server is running. For data STUs of more than a certain small size, only the header part of them are read and processed and their object id, offset within the object, and disk location are stored in the business object cache. The data STUs are read in full when the data part of the business object is accessed, generally by a state OS application, such as a media server. Thus, according to specific embodiments of the invention, every business object has at least one associated metadata STU having metadata (such as name and access information) and optionally additional data. For business objects like a video playlist, the data portion is small enough that it can be combined with metadata in one STU and so the metadata STU can contain the complete data of the object. But for business objects like video, the data portion is big and has to be stored separately in one or more data STUs.

State servers typically have a large amount of RAM. While a primary function of this RAM in state server is to hold business objects determined by processing STUs, some remaining part of it (possibly a very large part) can optionally be used for caching data STUs that may be requested frequently by state applications. The primary tasks of STU storage cache are to serve frequently accessed STUs from memory and make sure frequently requested STUs are replicated throughout the disk. To achieve this, all data STU read operations are monitored by the cache module and information about reads are maintained. When a STU is read more than a caching threshold, it is pulled into memory. Also when a STU read more than a replication threshold (which may be set per STU type, per state server, or per individual STU), an additional copy is created and stored in the storage media. It is worth remembering that, when space needs to be reclaimed; existing STUs are overwritten generally in order without any consideration. By keeping multiple copies of frequently read STUs, the undesired effects of deleting an STU is reduced. Any STU that was deleted but not replicated would be served from other state servers.

Generally, a business object cannot be deleted from State OS in the traditional sense. STUs that make up a business object would be still in the system and may slowly age out when nobody accesses them. However, according to specific embodiments, the invention can provide for a delete behavior using two methods. First, a new change is added to the business object being deleted (thus a new STU) that reverses all the previous changes, thus all existing properties are removed. Thus anyone accessing the business object will find it empty inside. The second method is to change the access control list (ACL) associated with the business object, preventing anyone from accessing it, which renders the business object invisible.

To save boot up time, cached information about business objects can be saved to non-volatile storage periodically so that when the server is shut down and then comes up, it restores the business object cache from the information saved earlier, thus significantly saving boot up time.

According to specific embodiments of the invention, STUs are passed from the State OS to state applications to create business objects and recreation of business objects and caching of business objects is primarily handled by state applications. This allows a media server application to create and cache business objects as appropriate for its particular types of data (e.g., media, playlists, channels) and a order processing application to handle business objects as appropriate to order fulfillment. Having different state applications define and manage their respective business objects allows more flexibility in how applications can handle and represent data than in traditional file systems. The core State OS, meantime, ensures that all metadata STUs are kept synchronized with other state servers and locates and stores data STUs as needed.

Synchronization

State servers generally keep their metadata STUs in sync (thus business objects are in sync too). STUs can become out of sync in the following scenarios:

1. State server is coming online for the first time, it has no STUs stored locally.
2. State server is up and running, new STUs are introduced at other state servers.
3. Some STUs have been deleted to make room for new STUs and they need to retrieved from other state servers.

The first 2 scenarios are more common. The third scenario will generally be relatively uncommon in state servers with larger storage capacity, though may be somewhat more common in some state servers that have smaller storage capacity. Even in those state servers, however, all the metadata STUs combined are not expected to require much storage compared to data STUs, so for most state servers, metadata STUs will most often always be available and stored locally. During initialization, state servers scan their disks and read the STUs, filling in the memory STU table. STUs found in sequence (e.g., with no missing STU's based on preceding timestamps) are sent to the applications to build a business object table. When all STUs are read, the state server needs to find the latest timestamp for each STU type for a particular business object that is in sequence (e.g., without any gaps. For example, if STU type 3 for a particular business object has 5 STUs 1, 2, 4, 5 and 6, it is missing STU 3, so the preceding STU 2 is the latest STU available for that STU type. When the state OS reads STU 2 and then determines that STU 3 is not available, it does not find and/or ignores later STUs until it has located STU 3.

In this case, the state server finds an available state server through DNS and tries to establish a signaling connection. As part of this connect sequence, a register message is sent. The register message lists the latest locally stored timestamp for each STU type for one or more business objects and also lists the parameters for a data channel that is able to receive new STUs. Since the initial synchronization may be time consuming, it is generally undesirable to receive all those STUs in the signaling channel.

For example, a register message according to specific embodiments of the invention may be as follows:

```
<Message Type="RegisterRequest">
    <Timestamp Type="MediaMetadata">10000</Timestamp>
    <Timestamp Type="MediaChannel">20000</Timestamp>
    <Timestamp Type="MediaPlaylist">11000</Timestamp>
    <DataChannel StreamId="12" Key="89ed34af" />
</Message>
```

A state server receiving a register message like the above, may have newer STUs, If so, it sends a reply listing the latest timestamp of available STUs and then establishes a data channel to send the new STUs to that server. The reply is similar to the message above. If the original state server receiving the reply has new STUs it can establish a data channel to the other server and sends its newer STUs. In this example of a register request, the latest timestamp of locally available STUs are specified for each type of business object, instead of an individual business object. Since a timestamp reflect the time at which an STU was written, just by having all STUs prior to a given timestamp, a state server is considered to be in sync up to that timestamp. If a state server has STUs up to 10000 for a type of business object but missing a single STU at timestamp 1500, it can only claim to have STUs up to 1500, which means the state server receiving such register request ends up sending all STUs later that 1500 for that type of business object, which results in an inefficient data transfer. To avoid such problems, a register request could also specify timestamps per business object instead of specifying a single timestamp to summarize all business objects of that type. This method results in a longer register request message but the data transfer to update STUs may be shorter since only the missing STUs are transferred.

During normal operation, newly created STUs need to be sent to other state servers. A message similar to the following is sent by the server to other servers in the group.

```
<Message Type="UpdateSTU">
    <STU Type="MediaMetadata" Id="{xxxx-yyyy}" Timestamp=
    "10020" />
</Message>
```

This is followed by the actual STU or STUs, in binary format. Any state server receiving this would update its STU cache and store the STUs on disk. It also sends them to the corresponding application to update the business object associated with that STU. To download missing STUs, a state server sends a message structured similar to the following, to the group leader and/or other servers in the group. A server receiving this message would send the UpdateSTU message described earlier to the requesting server.

```
<Message Type="DownloadSTU">
    <STU Type="MediaMetadata" Id={xxxx-yyyy} Timestamp="10020" />
</Message>
```

Income Tax Example

As an example business object, consider IRS income tax information. The tax state of an individual can be understood as a collection of yearly tax information, mainly derived from 1040, W2s and 1099s. Representing tax information using database technology generally requires multiple tables and splits the hierarchical data into different tables, which is not efficient. According to the data representation methods of the present invention, a business object is represented in its natural data format, but it is split into read only parts. In this example, the income tax business objects is split into multiple XML documents which can be combined into one single XML document. A user's income tax object is created when the first 1040 or W2 or 1099 is received. Whenever an additional document is received, it is added to his income tax object with additional read only STUs. In the proposed data representation, information received as XML document is saved as XML document, whereas in the database method the XML document is converted into tables. In the proposed method, the parts of a business object are independent and read only; they can be replicated to multiple data servers without worrying about keeping it in sync with changes, whereas in the database case, the information is not easily isolated and thus cannot be replicated. Thus the proposed method increases scalability while reducing complexity.

Note that while some prior art tax applications may treat tax data as XML documents, the present invention provides at least two advantages. First, because the operating system itself (state OS) inherently handles variable sized STUs and STUs are stored directly, the XML data structure does not have to be saved as a particular type of file, with all the file system overhead described above. Secondly, a tax database system that used XML files in a distributed environment would have to handle the complexity of keeping XML files stored at various locations synchronized. In the present invention, the state OS handles data replication and synchronization automatically for all types of data by synchronizing STUs.

Furthermore, when hierarchical data is translated to flat data like in a relational database, the translation is one way; the focus of this translation is to save storage and processing. So translating back from a relational data to hierarchical data is difficult and sometimes impossible, because a single table may be shared by multiple business objects.

Airline Reservation Example

Figure 3:
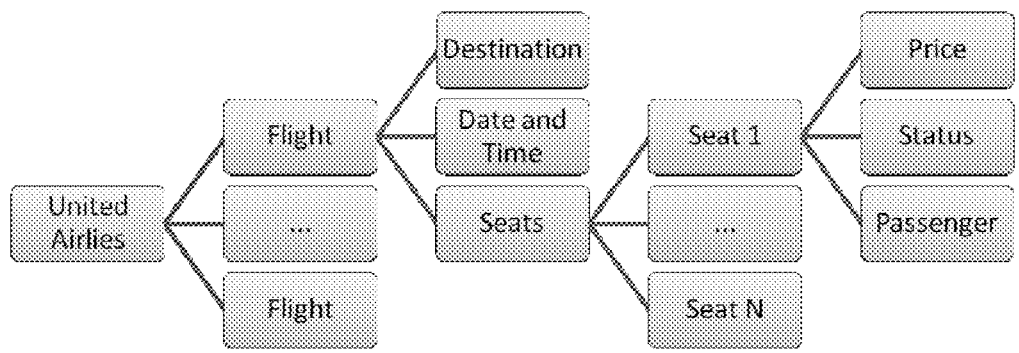
FIG. 3 is a diagram illustrating flight data according to specific embodiments of the present invention.

FIG. 3 is a diagram illustrating flight data according to specific embodiments of the present invention. In an airline reservation system, seats in a certain flight and date may be reserved. Let us assume the seat prices may change hourly. An airline has many flights classified on destination, departure and arrival time. Each flight has seats that can be reserved, with different seats offered at different prices. Representing this business object using database tables is not complex: for example, using two tables, one for flight information and other for seat information. The flight information table is relatively static, but the seat information table could change frequently, seats are held, released, reserved and the price changes. For applications using this data, since data format is not complex, it is easier to write applications. But for a widely used system like a flight reservation system, the database needs to scale to support thousands of users and applications.

In a database, when a column's value changes, old data is overwritten with new data. While this ensures that users accessing the database would always receive the correct data, data replication becomes difficult. Because of replication difficulties, a database doesn't scale well. According to the present invention, when information changes, instead of overwriting the old information with the changed one, the system just saves the change. This change would be propagated in the network and all the replicated data sources would reflect the change. Propagating a change is simpler to do than overwriting it.

Video File Example

Figure 4:
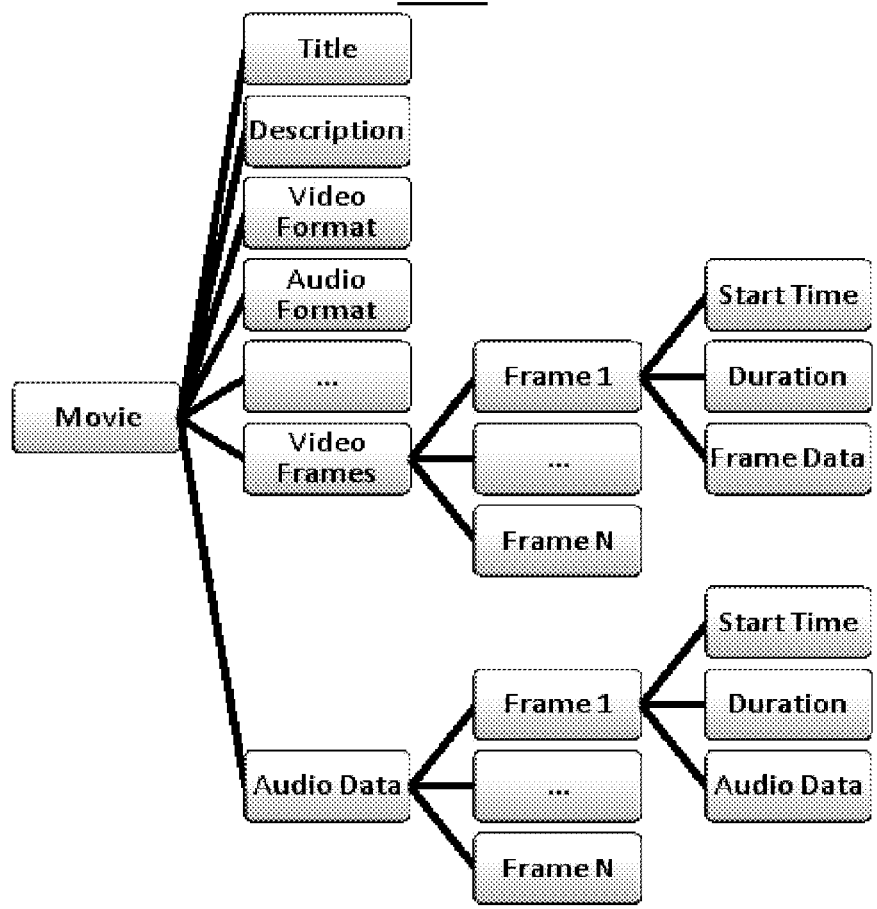
FIG. 4 is a diagram illustrating movie data according to specific embodiments of the present invention.

FIG. 4 is a diagram illustrating movie data according to specific embodiments of the present invention. All digital video files generally have metadata such as title, description, video size, duration, audio format info and video format info, video frames and audio data. Because video and audio data are large objects, ranging from a few MB to as much as 50 GB, it is not feasible to store them in a database, so they are usually stored by standard files systems in a file. A file generally does not have structure except to particular applications that handle certain types of video files. Thus a large video file is difficult to manipulate, it cannot be split into smaller files or merged into another file without opening the file using specialized applications. For example, without specialized applications, it is not possible to extract a 30 second video out of a the middle of a 2 hour video.

According to specific embodiments of the invention, a video file is split into many read only components. For example, three types of business objects or STUs may be created for a video file: (1) metadata, (2) audio frames and (3) video frames. Each audio and video frame contains the starting time, duration and the video and audio samples. Because the State OS inherently manages STUs and business objects separately, a large monolithic video file can be accessed into manageable parts. A user wishing to access 10 minutes out of a 2 hour video file, for example, can be given access to just those STUs or business objects associated with the 10 minutes of video, rather than access to the entire file. Whereas in a traditional file system, the entire video file would have to be accessed and potentially communicated to the user's location, in order for the user to access a portion of the file.

Data Backup

In State OS, STUs are considered dispensable. While a lot of effort is made to make sure STUs are replicated within a state server and among the state servers, there is no implicit guarantee according to the general state OS operation that a STU is available in the system. A number of protocols or implementations may exist to provide backup services when they are desired in particular installations. In some installations, a backup state server with removable storage that permanently keeps a copy of all STUs created is one possibility. Using the data discovery protocol discussed earlier, the backup servers would always request to receive new STUs and copy them to local storage media. When storage media becomes full, it can be supplemented with additional media or removed and archived. Other installations can have several state servers with larger storage capacity coordinate between themselves to ensure that at least one of them always has a copy of every STU.

State OS Networking Between State Servers

Data Discovery and Replication.

Even though effort is made to distribute data STUs throughout the State OS, it is not possible for all state servers to store all data STUs (metadata STUs are stored in every state server). An efficient data discovery protocol is required to discover the servers that have the required STUs and match it with the servers that need those STUs.

When a set of data STUs is required by one system, it is likely that other systems would also like to receive those STUs. State servers always try to store frequently requested STUs, and when a server has sufficient disk space, it doesn't hurt to store as many STUs as it can. Duplicating STUs among many servers increase the availability of business objects. It cannot be assumed that any server that has the required STUs would be able to transmit them; meaning storage capacity is different from network capacity. The network capacity of a server changes according to the existing data transfer operations. Thus we need an efficient mechanism to locate the server willing to transfer data and match it with the servers that need them. The mechanism of data discovery involves sending the request to all state servers in the State OS, and let servers choose if they want to supply the STUs or if they want to receive the STUs. This request is sent on the signaling connection and the reply is sent back on the same signaling connection. As explained in the networking section, the state servers are grouped into different groups based on network proximity. These groups are represented by group leaders and they thus create of tree of network nodes. As part of the data discovery protocol, a multicast tree is built and data transfer goes up to the top of the multicast tree. When the data reaches to top, it then branches down to all the receiving servers without duplicating data in a network segment.

The above mentioned data discovery protocol is initiated when data is requested by applications. Sometimes data needs to be replicated even when it is not requested by clients. This is generally necessary for administrative purposes, for example, to distribute data during off business hours when the network load is light. For example, a bank can send its daily video bulletin in the night before it's due, so it gets transferred to all the branches and is readily available at all the destinations in the morning. Otherwise sending the video in the morning to all servers would destabilize the network. Thus data replication among state servers is necessary to reduce the load on the network. To duplicate data, the same data discovery protocol is used, in this case the data STUs are requested by the same node that is willing to serve them, and all the state servers that need those STUs elect to receive them. Thus, the sender effectively requests the STUs it already has, expecting many other servers would elect to receive them. This type of scheduled data STU distribution is generally initiated by state applications at the state application level. For example, a user indicates to a media server application when uploading a daily video that it should be distributed to all or particular locations for a certain period even absent a request from those media servers. The media server instances then request the video data STUs at each state server and state OS handles the transfer using the networking protocol described herein.

The State OS typically does not provide networking services to users (though in some embodiments, the same hardware that hosts an instance of a state server may also host network router software). The State OS does however provide a communications protocol for connecting different state server hardware to provide the State OS storage, workflow, and middleware services. According to specific embodiments of the invention, this communications or networking protocol uses some concepts that are familiar from local area network (LAN) and wide area network (WAN) protocols, but these are combined and modified to most effectively handle the transferring of STUs and system data between state servers according to specific embodiments of the invention. Dynamic multicast data transfers, adaptable flow controls and clustered state servers are accommodated according to specific embodiments. Because the State OS is designed to be scalable to 1000s of state servers, the networking protocol includes mechanisms for grouping servers, electing leaders, and other aspects of network device self-configuration. While the networking functions and networking protocol of a State OS are generally invisible to users, there are important in specific embodiments for providing the storage services described herein.

Generally, state servers communicate with each other by sending and receiving messages and bulk data. Messages are short and generally used for housekeeping, synchronizing metadata of business objects and sharing network status. Messages are also used in exchanging commands to establish and manage data circuits. Bulk data transfer is the process transferring large amount of data from one state server to multiple data servers, this usually involves sending a business object's data, generally also as STUs. FIG. 6 is a block diagram illustrating a group of cooperating state servers according to specific embodiments of the present invention.

Message transfers require a fast network but not necessarily a high bandwidth one. Because messages are sent frequently, according to specific embodiments of the invention it has been determined that it is inefficient to create a network connection before sending a message and close it afterwards.

These network connections stay on for a long time after they are established. State servers maintain a direct or indirect network connection to every other state server in the network. Message transfers are authenticated and secure.

Figure 7:
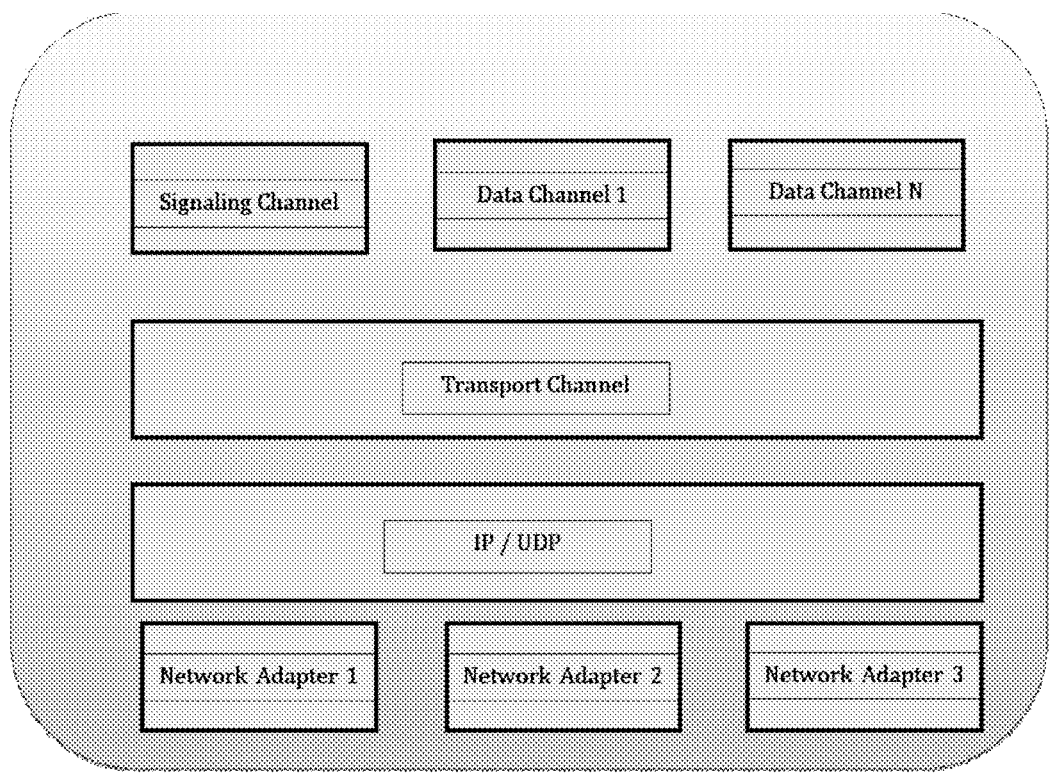
FIG. 7 is a diagram illustrating a state network protocol according to specific embodiments of the present invention.

Bulk data transfers involve sending large amounts of data, requiring high bandwidth connections that are not necessarily fast. Business object data STUs are normally sent as bulk data. Data connections can be established before starting transmission and terminated afterwards. Data connections are typically point to multipoint connections, thus requiring an efficient multicast protocol. Duplication of network connections has to be avoided, quality of service (QOS) has to be established and proper flow control mechanisms added to handle network bottlenecks. FIG. 7 is a diagram illustrating a state network protocol according to specific embodiments of the present invention.

Bulk Data Transfer

According to specific embodiments of the invention, a State OS installation is designed to scale up to thousands of state servers. State servers generally do not maintain a one to one message connection to every other state server, thus according to specific embodiments of the invention the State OS provides that state servers create groups based on network proximity. These server groups are dynamically created and they automatically elect one state server as their group leader. A group leader acts as a proxy for the group. The server groups can create a group of their own, thus creating a hierarchy of server groups. Thus, state servers according to specific embodiments of the invention establish a semi-permanent message network when they start, and they create data networks on demand. Data networks are created by sending messages in the message network, thus data network work under the context of message networks.

To summarize, State OS networking stack contains signaling and data channels. The signaling channel is used for sending messages related to synchronizing metadata STUs, to establish a data channel and other such inter server communications. Each server maintains a signaling channel with every other server in its group. Each group contains a group leader which connects to group leaders of other groups. Data channels are created dynamically during bulk data transfer. There can be multiple data channels between two servers, each identified by a stream id.

Generally, each state server runs a RTSP server which serves media to media players (like Windows Media Player) using standard RTSP/RTP/UDP protocols. Consider a State OS installation that has 10 servers in a single group, with server 8 elected as the group leader. Media is distributed among the servers, a media player connected to a server requests to play a movie (Movie 1 in the following example) starting from 3 seconds and up to 50 seconds. Now the state server should deliver audio and video data to the media player.

Server 1 (Playing)

| Media Id | Stream Id | Start | End | Disk Offset |
|---|---|---|---|---|
| Movie 1 | Audio | 0 | 300 | 10010 |
| Movie 1 | Video | 0 | 15 | 20010 |
| Movie2 | Audio | 0 | 400 | 20300 |

Server 2

| Media Id | Stream Id | Start | End | Disk Offset |
|---|---|---|---|---|
| Movie 1 | Audio | 0 | 300 | 10010 |
| Movie 1 | Video | 15 | 30 | 20010 |
| Movie2 | Audio | 0 | 400 | 20300 |

Server 3

| Media Id | Stream Id | Start | End | Disk Offset |
|---|---|---|---|---|
| Movie 1 | Audio | 0 | 300 | 10010 |
| Movie 1 | Video | 30 | 40 | 20010 |
| Movie2 | Audio | 0 | 400 | 20300 |

Server 4

| Media Id | Stream Id | Start | End | Disk Offset |
|---|---|---|---|---|
| Movie 1 | Audio | 0 | 300 | 10010 |
| Movie 1 | Video | 35 | 45 | 20010 |
| Movie2 | Audio | 0 | 400 | 20300 |

Server 5

| Media Id | Stream Id | Start | End | Disk Offset |
|---|---|---|---|---|
| Movie 1 | Audio | 0 | 300 | 10010 |
| Movie 1 | Video | 40 | 80 | 20010 |
| Movie2 | Audio | 0 | 400 | 20300 |

Other servers in the group have no media data for movie 1.

Server 1 has audio data locally stored, video data is locally available for 3 to 50 seconds, it doesn't know where rest of the video data is. So it prepares a download request and sends it to every server in its group (servers 2 to 10). The requesting server doesn't know how many STUs are part of this video data, so it can't request specific STUs. The request looks like this:

```
<Message Type="DownloadMedia">
    <Media MediaId="Movie 1" StreamId="2" StartTime="15"
    EndTime="50"/>
    <DataChannel StreamId="12" Key="89ed34af" />
</Message>
```

This request specifies that this server needs 15 to 30 seconds of stream 2 (video). It is prepared to receive data on stream id '12' and the authorization key is '89ed34af'. Any server initiating a connection to this server should use the authorization key, otherwise the connection will be rejected.

When server 2 receives this request, it looks up its local table and finds that it has STUs for 15 to 30 seconds. It prepares 'AvailableMedia' message and sends it to every server in the group. This message looks like this:

```
<Message Type="AvailableMedia">
    <Media MediaId="Movie 1" StreamId="2"
    StartTime="15" EndTime="30"/>
</Message>
```

When server 3 receives the original download request, it sends 'AvailableMedia' message for 30 to 40 seconds. Server 4 sends 'AvailableMedia' message for 35 to 45 seconds and server 5 sends 'AvailableMedia' message for 40 to 80 seconds.

When server 7 receives the request, it finds it doesn't have the data, but it wants to receive the same data server 1 is requesting, so it sends a 'DownloadMedia' request with the flag Mirror as true.

```
<Message Type="DownloadMedia" Mirror="true" >
    <Media MediaId="Movie 1" StreamId="2" StartTime="15"
    EndTime="50"/>
    <DataChannel StreamId="44" Key="348djfh" />
</Message>
```

When the flag 'Mirror' is specified, other servers don't generate 'AvailableMedia' messages. In this implementation, the group leader (Server 8) is responsible for aggregating these messages and initiate path establishment. So server 8 sends the following 'SendMedia' message to server 2.

```
<Message Type="SendMedia">
    <Media MediaId="Movie 1" StreamId="2" StartTime="15"
    EndTime="30"/>
    <To NodeId="Node 1" StreamId="12" Key="89ed34af" />
    <To NodeId="Node 7" StreamId="44" Key="348djfh" />
</Message>
```

This message tells server 2 to initiate path establishment to server 1 and server 7. Server 8 sends similar messages to other servers for the remaining media data.

Path establishment is the process of establishing a data channel from one source to multiple destinations. This path might go through state servers that don't really consume the data, they just route data.

```
<Message Type="ReservePathRequest">
    <Media MediaId="Movie 1" StreamId="2" StartTime="15"
    EndTime="30"/>
    <Path Id="Path Id" QOS="20Mbps">
        <Destination Node="Server 1" StreamId="12"
        Key="89ed34af">
            <Route />
        </Destination>
        <Destination Node="Server 7" StreamId="44"
        Key="348dfbd">
            <Route />
        </Destination>
    </Path>
</Message>
```

This message is sent to servers wishing to receive the media data. In this case, both the sender and receiver are directly connected, there is no router involved. The purpose of the reserve path request is to reserve bandwidth, if a node is not able to reserve bandwidth it does not forward the message downstream nor it generates a reply.

When the receiver receives the 'ReservePath' request, it turns around and sends a "ReservePath" response to the sender. As the reserve path response progresses to the sender, bandwidth is actually committed and connections are established. When the original sender (server 2) receives the response, it establishes the connection to the next node in the path and completes the path. It is now ready to send data. In this case, the data is actually a list of STUs for between start time 15 and end time 30 seconds. Similar message sequences are executed for the remaining media data.

It is worth remembering that this whole sequence was started as a result of a media player sending a play request to the RTSP server. The RTSP server is not aware of the STU transfers happening behind the scenes, it just reads media data STUs from local storage. It is expected that STUs are received from other state servers by the time the RTSP server needs them, but if it doesn't find media data in local storage it waits for data to arrive. If RTSP server doesn't find data after a configured time interval, it errors out and closes the client connection. In rare cases, media data may not be available in any of the state servers, in this case media cannot be served by a RTSP server. To rectify this issue, the media may have to be uploaded to one of the state servers again. Data channels are released when data transfer is complete.

In specific implementations, the networking requirements of state servers get more complicated. State servers may typically have multiple network adapters. To make use of this feature, data traffic is load balanced and when one network path fails the remaining network paths may be used. In a typical TCP network, the adapter's IP address is used to identify the system, but in a system of state servers with multiple adapters a GUID according to specific embodiments is used for state server identification. This GUID is generated when the State OS server software is installed.

In some implementations, state servers may be virtualized, meaning there is not necessarily a one to one correspondence between state server instance and the underlying hardware. A single state server instance can span multiple computers located next to each other and connected in a local network. Alternately one physical computer may host multiple state server instances. These networking requirements of state servers are a further reason that a new network protocol according to specific embodiments of the invention is preferred in specific embodiments for a State OS system.

One feature of the State Exchange Protocol (STX) is the separation of signaling from data. A signaling channel carries messages and a data channel carries bulk data. A signaling channel is semi-permanent, created when state servers come online and stays active during state server operation; data channels are temporary, valid only for the duration of data transfer. State servers according to specific embodiments of the invention constantly synchronize business object metadata, network status, server status, client status, application status and many other things, and this constant data traffic in specific embodiments is handled using a dedicated network connection reaching all servers. A signaling channel is optimized for sending messages, which are short. In specific embodiments, many of the messages may be combined into a single large payload.

Generally, in larger networks of state servers, a state server makes a dedicated signaling connection to every other server it its group. It reaches other state servers by creating an additional connection to its group leader. By this arrangement, each server is connected to every other state server in the network.

Network Signature and Network Proximity

A significant factor in organizing state servers into groups is measuring the network distance between two servers; referred to herein as network proximity. While each server has a GUID that uniquely identifies the server, it is static and thus cannot be used for network proximity calculations. But there are many parameters that change depending on where in the network the server is connected to and the parameters of network adapters in the system. Thus the primary parameters for measuring network proximity are the IP address and mask of each network adapter in the server, MAC address of the default router, IP address of the DHCP server and IP address of DNS and directory servers like active directory. These parameters combined using a static algorithm create a network signature.

Network signature is one of the parameters used in network proximity calculations. These calculations are typically done for identifying server groups and finding the best route between two servers. The servers in a group should exhibit similar network signatures. Another significant factor in grouping servers is the network bandwidth between them. Each connection between servers in a group should have high bandwidth and low latency. Thus measuring bandwidth is an important function of a state server. As is true in some known networking router devices, when a server starts up, it generally has no information about other state servers. It then contacts the directory server and discovers the IP address of other state servers; it then connects to other state servers and exchanges state information with them. As part of this exchange, each state server sends bandwidth measurement packets to the new server. According to specific embodiments of the invention, bandwidth measurement packets are UDP packets with a known size and a known delay between them, on receipt of these packets, the receiver can measure the bandwidth by comparing the received delay with the expected delay.

State OS servers measure bandwidth between them as part of the data transfer protocol, thus bandwidth is not static and varies depending on the resource usage. This measured bandwidth is part of the network status that each server shares with others. Each group leader creates a summary of the bandwidth measurement of its members.

Transport Protocol

In specific implementations, both signaling and data channels use the same transport protocol. This protocol in a currently implemented embodiment is modeled on Stream Control Transmission Protocol (SCTP) as defined in RFC 4960. Some differences between the two are discussed below. A fuller discussion of SCTP is provided in RFC 4960. SCTP protocol is layered on IP directly. In specific embodiments, STX protocol of the invention is layered on UDP. This is done mainly to aid development and debug, since user level code is easier to manage than kernel level code. By default, STX uses port 4201. SCTP ports are used for different applications of State OS, first 16 ports are reserved.

While SCTP handles failover between network adapters, STX encourages load balancing between adapters. In both TCP and SCTP incoming connections are automatically accepted at the network layer without informing the application layers. In STX, incoming connections would be either accepted or rejected by the applications. To enable this, the system initiating a connection needs to pass additional application specific parameters in the STX cookie accept packet. For a signaling connection, this would be authentication parameters, for a data connection this could be connection identifier issued by the signaling channel. The receiving applications compares these parameters with expected ones, and reject the connection request if parameters don't match.

In STX, data traffic is shaped according to the quality of service (QOS) negotiated in the signaling session. To shape the data traffic, the sender utilizes high resolution timers to send only sufficient amount of data for a given time interval. In STX, the transport protocol is responsible of traffic shaping; the application doesn't have to shape the traffic.

Signaling Channel and Register Message

The signaling channel is a dedicated channel for sending and receiving messages between state servers. In specific embodiments, the signaling channel is layered on STX transport channel, and uses the ordered, reliable data transfer offered by the transport channel. Thus, messages received on the signaling channel are error free.

According to specific embodiments of the invention, the signaling channel carries messages formatted similar to HTTP messages in that they have header and body. In HTTP, the header is a collection of name value pairs separated by new lines and colons. Whereas in STX, the message header is an XML document with names saved as XML elements. The values are stored either as XML values or XML attributes. The header is separated from the body by a predefined sequence of non-printable ASCII characters. The body is considered opaque data that is meaningful to the method specified in the header. In general, messages sent on the signaling channel are either generated by the State OS or generated by applications running under the State OS. State OS messages are used for housekeeping.

Register Message

An important State OS message according to specific embodiments of the invention is the register message. When a state server comes online, it queries a central configuration database for any available state servers. This database, according to specific embodiments, is located at network address that the state server can access when it first comes online. If the newly online state server finds another state server, it establishes a signaling channel and sends a register message. This is generally done after the state server has read its own storage and processed all STU's that are locally stored, as described above. The register message includes a summary of the current state of the server, which includes information about the applications running, the list of servers it is connected to, the types and timestamps of the STUs stored locally and resource information about the server. The server receiving the register message sends a response which includes the receiving server's state. When this response is received by the original server, the local server's state and the remote server's state are compared and any missing metadata STUs are transferred. This transfer takes place in both directions, thus register messages enable servers to synchronize with other servers. It is worth repeating that only STUs related to metadata are synchronized, the business object data which is typically stored in large STUs are not synchronized. When a state server is administratively shutdown, it unregisters with other servers and closes the signaling channel.

Each state server should be able to locate at least one other server. State OS according to specific embodiments of the invention can use host operating system specific facilities for discovering other servers. In a Windows environment, a state server can query DNS and get service mappings for State OS which lists the available servers for the State OS service. An implementation on Linux could use another OS facility as a central configuration store.

Path Management

Another common use of signaling session is to send messages related to establishing, terminating and managing data channels or paths. Data channels are temporary and need to be terminated at the end of data transfer. These data channels are dynamically established using signaling messages. Using signaling channels, data channels are point to multi point, with point to point as a special case. The signaling messages related to establishment, maintenance and teardown of a data path are called path management messages.

Before establishing a data path, the source state server knows the list of destination servers and the bandwidth requirements for the data transfer. It then calculates the best route to reach all the destinations avoiding duplicate links. It then sends a path establishment request along the chosen route. The servers along the path forward the request if the bandwidth requirement can be honored. When the end servers receive the path establishment request, they reply with a path establishment response. As the path establishment response progresses, data channels are created and bandwidth is allocated. In a typical embodiment, all data paths are one way, if data has to be sent in the opposite direction of the path, a new path has to be established. State servers in the middle of a data path function as routers, they have buffers to hold data and account for the difference in bandwidth between upstream and downstream servers. Once a path is established, any data sent on the data channel is forwarded to all the destination servers in that path. A path can be terminated by sending a path teardown message.

Data Channel

A data channel is described as a data stream between two state servers. Each data stream is identified by a stream id. Each data channel has a secret identifier that is negotiated in a signaling session; this secret id is a required parameter to open a data channel between two servers. This feature prevents anonymous creation of data channels. Data received on a data channel are either forwarded to another data channel or sent to a receiving application. Data streams are packet oriented; packet boundaries are preserved from the transmitter to receiver. This behavior is unlike TCP where data is delivered as byte streams. According to specific embodiments of the invention, byte streams are not supported in STX.

Summary of State Networking Differences from Traditional Protocols

In summary, the State Networking Protocol according to specific embodiments to borrows some concepts and techniques from different LAN and WAN protocols, such as SCTP for transport, ATM forum's PNNI for routing and peer group organization, RSVP for resource reservation, Kerberos for security, DNS for naming and similar protocols. However, the State Networking Protocol has a focus on signaling and data channels, the constant nature of the signaling channel and its utilization, and how data channels are dynamically built. The State Networking Protocol generally is not binarily compatible with standard networking protocols.

Therefore, while some aspects of a State OS networking will be familiar from traditional network protocols, according to specific embodiments of the invention, one or more modifications are used to more effectively provide the data services of the state OS. Some of these differences include: 1. Network proximity algorithms and the parameters used. 2. Network flow control based on bandwidth (not just on packet delay as in protocols like TCP). The receiver sends feedback to the sender about bandwidth utilization and resource usage at its side and suggest if the bandwidth needs to be increased or decreased. The sender adjusts the bandwidth accordingly. 3. Connection admission control—Unlike TCP, connections are not automatically established between 2 systems. The following security mechanisms are enforced for allowing connections between state servers a. Both state servers should be members of the same security domain (like Windows Active Directory domain) b. Each state server should obtain Kerberos security token before communicating with another, this ensures that processes in a state server run under a secured Windows account. c. When a state server connects to another, it is directed to an application running in state server or the signaling stack of the core OS. Additional parameter specific to the application are sent along with the connect request which gets validated by the other end. Only when the application allows a connection, it can be established. 4. Messages are asynchronous and one way. No reply is sent to a message. 5. A data channel is unidirectional.

According to further embodiments of the invention, in some state OS implementations, business objects are not just static data but can be associated with business rules. In this case, a change in a business object will initiate the processing of one or more business rules and these rules can triggers tasks and events that can then create additional business objects. Other objects, such as actionable user alerts can also be created. According to specific embodiments of the invention, a state OS can include a comprehensive workflow package to handle business rules, which is generally referred as a state workflow package. Workflow tasks run on state servers and have associated executable code. These tasks implement a finite state machine that tracks and transitions business objects. An instance of a task is created as needed and a task instance is associated with one or more business objects. Each instance of a task has a unique task ID. Workflow tasks themselves have no data storage capability; they store their state in the business objects associated with an instance of the task. Such state can be thought of as local and data variables of an executing program. While a workflow task is not exactly a business object, it can create additional business objects as it needs them, including business objects necessary to store any state. Other components of the workflow package like events, actions, alerts and timers work in the context of a task.

Events are messages sent to an application; they are either manually generated by user action from a user interface, or generated automatically by a workflow task. Alerts are generally notifications to users. These alerts are either targeted at an individual user or a group of users. Alerts can manifest into a method to trigger user's attention, via email, SMS, instant message, automated voice call or even plain old postal mail. When alerts are sent to groups, it is either sent to everyone in the group or an individual selected using an algorithm. When alerts are not responded within a certain time limit, a reminder is sent to either the same user or another user in the same group.

The State workflow package is used by applications running in a state server to handle their workflow requirements. Such applications define a list of tasks, which are named and associated with executable code, a list of named events, a list of timers and a list of alerts. This information is registered with State workflow when the application starts. Since state servers are symmetrical, this workflow environment is available in all servers, thus a task can execute in any of the servers and an event can be sent to any server.

Figure 12:
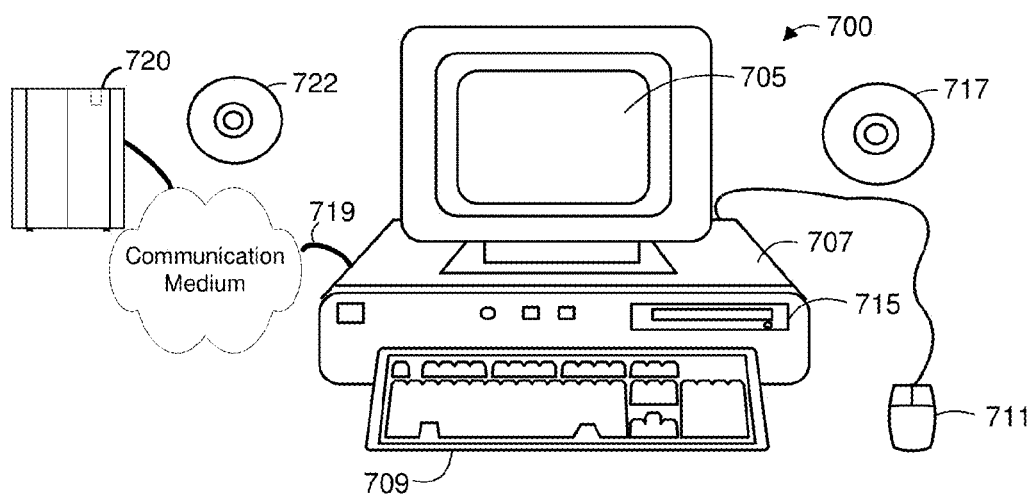
FIG. 12 is a block diagram showing a representative example logic device in which various aspects of the present invention may be embodied.

The lifetime of a workflow task can vary from a few seconds to many days. For a long lived task, the executable code runs only intermittently. A task executes as a thread under the host operating system, saves its context at the end of execution, then resumes execution at a later time either at the same server or another server. So when a workflow task is said to run in State OS, the underlying executable code, which is part of the application, could be running in any state server. As an integral part of the application, a workflow task has the freedom to invoke any of the application's features. Generally a task runs in response to an event or timer. FIG. 12 illustrates the architecture of a task, it handles events received and generates alerts as the task transitions from state 1 to state N.

As an example, in a media server application, the media report generation component of the application may be implemented using State workflow package. When a video from a media server is played by a media player, a log is sent by the media player listing parameters like video title, start time and duration. This log is sent the media reporting workflow task as an event which saves the information in the media business object and in the enterprise wide media report business object.

When a media server starts, it registers the following task and event with the State workflow package, along with other tasks and events.

```
<Task Name="MediaReportTask"
Function="NetworkState.Media.MediaReportTask">
    <Event Name="MediaLogEvent" />
    <Timer Name="MediaReportTimer" Interval="30" />
</Task>
<Event Name="MediaLogEvent" />
```

In this XML, the media reporting task is associated with a media log event and a timer that generates an event every 30 minutes.
Now when a media player sends a log, it is converted to a media log event as shown below.

```
<Event Name="MediaLogEvent">
    <Media Id="{xxxx-yyyy}" Start="15" End="50"
    Time="2/12/2010 5:25PM"/>
</Event>
```

This event is now sent to the media reporting task using a host operating system specific mechanism. In an example implementation, this event is written to a task specific queue that is serviced by a thread. When this event is read from the queue, all workflow tasks associated with that event are executed. Generally, the same state server that receives an event runs the tasks associated with that event. In this example, the media report task saves usage statistics in the media business object and with enterprise wide usage business object, the task doesn't have its own storage.

In this example, the media reporting task runs within the scope of the media server application, in other cases a task could run within the scope of a business object. In such a case, the task's unique identifier is stored in the business object and is passed to the task when it is scheduled. Such a business object level task is generally triggered by an application level task.

A timer is a special type of event that is triggered at a specified time, which is either an absolute time or relative to the current time and optionally repeated at a specified interval. Timers are provided by the State workflow package, they are either started when an application initializes or on demand by a workflow task. The application level timers started during initialization would be running all State servers, thus executing the same code at the same time. Special algorithms are needed to minimize the effects of collision, one such algorithm is to trigger timer events at different second offsets within the minute, another algorithm would restrict timers to execute only in certain servers like a group leader. The State workflow package also provides alerts, which are user visible actions that can be invoked by tasks. For example, an email alert would send an email to the users specified.

State OS API

This is the State OS's interface to the external world. This component defines a new asynchronous connection oriented messaging framework for secure access of business objects. Instead of rigid framework like web services and WSDLs, state API is packaged as directly usable software library to target likely client platforms. In other words, State OS exposes its features through state application programming interface (API). This interface is expected to be used by management applications and gateways.

An example of a management application would be a media explorer, which is a GUI application for viewing and managing media stored in state servers. An example of a gateway would be an application that imports information from web servers into to state servers. In specific embodiments, State API is accessed through TCP protocol and using TCP port 5201 by default. State servers and clients communicate using messages. Each message has a header and a body. The header is variable length xml text and the body is a variable length binary byte array. The header and body are separated by a sequence of non-printable characters.

Messages Represent API Functions.

Messages are classified based on the method name, and the corresponding parameters. Parameters are named entities, they have name and value. Method name and parameters are stored in the header XML document as XML elements. Each message has one method and many parameters depending on the method name. The parameters can have attributes and values; the choice is dependent on the method name. The parameters themselves can be XML elements and parameter values stored as XML nodes. XML elements can have only one instance of attributes but many instances of values, this fact drives the choice between using attributes and values. A message may have multiple instance of the same parameter, the order in which parameters appears is significant depending on the method name. When different parameters appear in a single message, the order of parameters is not relevant.

Messages are One Way.

This is different from remote procedure calls (RPC), meaning messages cannot be treated as functions that return a value. The server doesn't acknowledge every message it receives, it is the client's responsibility to see if the message was received by server.

Messages are Asynchronous.

Messages are sent in either direction without waiting for completion of earlier messages. Messages only indicate the start of an operation, they don't necessarily mean the operation has completed. This is different from a request-reply model where the client sends a request and the servers respond with a reply. The server can send a message without waiting for a message from clients.

State API is Dynamic.

This is different from web services where a method signature is constant and defined in WSDL. The parameters in a message can change as the server software evolves. The design of state API doesn't guarantee that the list and type of parameters don't change between versions of server software. It is left to the server software to maintain backward compatibility.

State API is Defined in DLLs and Libraries.

There is no text based description of state API, like web services are described using WSDL. Each type of message is exposed as a function in the DLL. Support of different programming languages and operating system is handled by supplying multiple DLLs.

While most messages are application specific, a set of messages are reserved for clients to communicate non-application level information. Some system defined messages are used to manage a session, which is an authenticated connection between clients and State OS. The purpose of the register system messages is to register the client with the server to handle identification, authentication, authorization and accounting.

When a client connects to the server, it first sends a register message. The parameters of a register message include the user name, computer name, active directory domain, and authentication information. This registration is handled by the state API client library, which assumes the identity of the process calling this library, thus it automatically collects security information from the host operating system. This means the user has to explicitly log into a security domain (like active directory) and then start the client process under that user. This also means a user is not expected nor allowed to enter username, password and other security related information. The State OS doesn't authenticate users by itself; it delegates the responsibility to other security systems, like Kerberos in Windows.

The client security information is passed to server in a secure way as defined in the security system of the client operating system. For example, in a Windows domain, clients can use Kerberos messages to pass identify information to server. The server being in the same security domain (as the client) can get the user's identity from the information passed. The information sent by the client is encrypted and is meaningful only to the security components of the server and client. This prevents user spoofing.

Clients locate state server through a central configuration source like active directory. If multiple servers are listed in the configuration, one of the servers is contacted by the client software. When a registration message is sent, the selected state server compares the client's network parameters (IP address/mask, router information, DHCP information) with the identity of other state servers in the network. A state server is chosen based on network proximity and resource usage, then a redirect message is sent to the client. The client then connects to the newly redirected server.

When a client registers with a state server, the information about the device used in registration, the user identity and the applications accessing are saved in the State OS and can be lookup by other state servers. This information can be used to locate the user and device, which is especially useful for email and messenger applications. When a client exits, it sends a unregister message to the state server. Apart from the system messages, each application running in the State OS can define own messages. These messages are sent on the same secure network connection described earlier.

Since business objects stored in the State OS are secure entities and governed by access control lists (ACL), only a subset of business objects may be available for access by a given user. Each business object has this security information associated with it, this generally includes the identity of the owner, the list of users and their associated access rights (like read or write).

It is worth noting that the clients do not have access to the STUs, they can only access the complete business objects. Since state servers are symmetrical, accessing one state server is same as accessing any other state server.

A user interface application using this API would be able to create, list, modify, delete, upload and download business objects. For example, a media explorer application uses this API list to list all the media available to the logged in user, the user may then view playlists and channels. The user may add or remove entries in playlists, and create and delete playlists. The user may add, delete and modify channels using this API. The user may upload new media to the state server.

When a client uploads a large business object into a state server, it may tie up the message connection thus preventing access to the server while data is uploading. To solve this problem, a data upload service is used. This upload service is created after an upload message was sent to the server; information about this service (the TCP port, business object id) is reported back to the client. The client then makes a data connections and uploads data for the same business object id. This connections is valid for the duration of uploading data, and valid only for the given business object. This is not a general purpose connection.

State OS UI

Since State OS is designed to run multiple applications, each application can have a user interface component. However, in specific embodiments, instead of letting each application develop their own look and feel, a system of the invention optionally provides a common UI framework that applications can use. This results in an intuitive and consistent visual experience. This UI framework is designed to run on PCs and mobile devices, and supports keyboard, mouse, touch, and any other available input. This UI framework runs as a standalone GUI, the state server applications plug into the framework and extend it. To end users, all State OS applications can look like an integrated single desktop/mobile application. State OS GUI is designed as an infinitely long canvas showing rectangles belonging to different applications and business objects. Each application decides what do display in this rectangle. State OS GUI provides GUI controls to restrict the rectangles shown based on application specific criteria, and also controls to pan and zoom. The rectangles shown can be in two modes, summary mode and detail mode. In summary mode applications choose to show simplified view of the objects shown, in detail mode applications may choose to display a bigger rectangle showing details of business objects. The detail mode is expected to be user interactive while summary mode is not. The rectangles show live content as updated by applications.

State Gateways

State OS is designed according to specific embodiments of the invention to coexist with many different technologies and software environments. State gateways are the bridge between other technologies and State OS. For example, business objects in State OS can be exposed through web pages. For this, a web server needs to be built to use State API to access the business objects and convert them to web pages. Thus, Gateways are applications running outside the State OS that convert business objects to other data representations. Examples are, a media gateway that converts audio and video frames from state servers to RTSP based media streams to be played by standard media players, a order management web server that converts order business objects to web pages for users to view and create orders. The gateway use state API to access business objects.

Gateways, as they are run outside the State OS, provide data bridging. This feature is useful in a hybrid setup, where data is available from both the State OS and legacy sources. Enterprises may not migrate fully from current data sources like databases to State OS storage. In this case, gateways initially import data from databases into State OS. Then at regular intervals, modified data is copied from State OS back to databases and also in reverse direction. This enables data to be synchronized in both environments.

In specific embodiments, Gateway software is isolated from State OS. Gateway software is typically much more complex than workflow code running inside the State OS. Running gateway software inside State OS in some instances is not desirable and may be detrimental to the integrity of State OS.

Gateways use state API to access business objects inside State OS, similar to user interface modules. They typically run under non-interactive domain user account which allows the gateway process run as a service. Gateways can be developed in a computer language for which state API library has been provided. Gateways are not restricted to run on any specific operating system.

An Example Implementation According to Specific Embodiments of the Invention

In general, a state operating system according to specific embodiments is designed to be implemented on different host operating systems and programming languages. The host operating system can be a popular operating system like Microsoft Windows or Linux or an embedded operating system like VxWorks. The programming language could be a mix of C/C++ and Java or C#. Delay sensitive functions may be implemented in C/C++, while high level and interactive functions may be implemented in C# or Java. This section discusses some details of an example implementation with a particular focus on an enterprise system based on Microsoft Windows, Active Directory and DNS. This description of an example implementation is provided to further describe aspects of particular embodiments of the invention and is intended to not further limit the invention beyond the attached claims.

As discussed above, in particular embodiments, a state server is not expected to be a general purpose server, it runs only State OS related software and does not contain other middleware or server components like a database, web server, email server, file server or security and virus scanning software. A state server may be sold as an appliance like a router with all the software preinstalled, while a user can update State OS software they are not expected to install third party software.

In this example implementation, the state server is loaded on top of Windows Embedded or Windows Server with minimal services configured. The server is a member of the enterprise active directory domain and is configured to automatically log in a user id specially assigned for State OS. Services like web server and file server are turned off. State OS software is installed along with the Windows partition of the boot disk.

In this example, a state server is designed to be a transparent device. Enterprise IT admins are not required to login and carry out operations, and the server is self-configurable as detailed later in the chapter. It doesn't require regular backup or similar maintenance activities. Since it doesn't store files from other sources there is no need to run security software. The software running in a state server are digitally signed.

State OS data is stored in additional disks and partitions managed by State OS. These partitions are not visible to Windows operating system and no standard Windows utilities may be used to view data inside these partitions. In some implementations, a state server is an intranet only device, so users from the internet are not allowed to connect to it. State OS software is installed as multiple applications, and at a minimum contains the bootstrap application and the core OS application.

The bootstrap application is a standalone application that is responsible for ensuring that the right version of State OS software is running and monitor the health of other State OS applications running in the server. Each state server maintains the list of binaries installed in the server and their version number and this information is synchronized with other state servers. When new software is installed in one machine, those binaries are copied to other machines. This data transfer is done by the core OS application using the signaling channel described earlier. Each state server is configured to run the version of software configured, when the bootstrap application finds a mismatch it terminates all running applications and restarts the right binaries. When an application terminates unexpectedly, the bootstrap application logs the information and restarts the application.

The core OS application is responsible for data storage, networking, client access and operations common to multiple applications. The core OS has two major components, the first is a controller responsible for synchronizing information with other state servers and communicating with clients, the second is a data gateway responsible for bulk data transfer between servers. These components may be split into multiple applications. As mentioned earlier, a state server can run on a single computer or multiple computers connected to a local network. There can be only one instance of the controller application, but may have multiple data gateway applications. When there are multiple date gateway applications running on different computers, the controller maintains a direct connection with each one of them. The controller is responsible initiating, maintaining and terminating bulk data transfers between data gateways of different state servers.

State servers are located by other state servers and client using DNS or other discovery protocols. This mechanism is similar to Windows clients discovering the active directory server. The enterprise DNS server has an additional SRV entry for some or all of the state servers in the enterprise; this entry lists the IP address of the state server. Clients of State OS located the server using DNS, but the server the client connects to may choose the redirect the client to another state server closer to the client. Adding this DNS SRV entry can be carried out manually by enterprise IT administrators.

Example State Server Initialization

When a state server boots up, it could be resuming from many different states. If this is the first time it's coming online, it has no previous state, it has to be get current state from other state servers. When the server has STUs stored already in the disk, it has to read the STUs, execute the commands associated with the STU or marks the presence of that STU. In some cases a state server might have persisted its cache of business objects before shutting down, in which case the cache is restored when the server comes online; the STUs stored locally are processed again to validate the cache.

In every case, a state server coming online has to sync with other state servers. The primary objects synchronized are the business object cache, server configuration and status, client information. To synchronize the business object cache, a state server builds a list of business objects in its cache, their id and their latest timestamp. It is worth noting that the business object cache contains information about business objects and not necessarily the data associated with that business object. When a server sends information about its cache to another server, the sending server may actually have more recent information in which case the receiving server may request it, but when the receiving server has latest information then the sender requests it. Thus both state servers exchange information to bring both of their caches up to date.

Each state server maintains a list of business objects available in the State OS, it is imperative that this list is synchronized with all other state servers. Each business object is uniquely identified by a type (which can be simply a numeric value) and each instance of that business object is uniquely identified by a GUID. Each instance of a business object has a timestamp that identifies the most recent STU of that business object and also therefore the version of that business object; a business object with a later timestamp is an updated business object. All business objects have metadata, which is a list of their properties and some business objects also have additional data that can be of variable size. This additional data is not synchronized between servers, it is transferred on demand.

When a state server starts, it reads STUs from disk, identifies the STU type and adds it to the list of STUs for that STU type. This STU is also sent to the application associated with it which in turn creates or updates the business object. Once all STUs are read, the state server has the latest timestamp for each STU type, which would mean it has all business objects associated with that STU type up to that timestamp. The state server would now be interested in receiving STUs that are later than this timestamp. Since reading the STUs from disk is a time consuming operation, as an optimization, before a state server shuts down it stores the business object cache in a disk file. This disk file is read during startup and recreates the business object cache.

Once a state server inventories the local STUs, it can start the sync operation with other servers. To locate other state servers a DNS query is made for SRV entries belonging to State OS. These DNS entries should be have been created by a system administrator managing the State OS instance. The server then creates a signaling connection and sends a register message to the first server in the list of SRV entries. Information sent on registration includes the latest timestamps for business objects, server configuration like its number of CPU cores, system memory size and disk space available for STU storage. After the basic registration handshake of sending and receiving messages, each server requests STUs it needs from other server. Since this exchange could be time consuming, a dynamic data channel is established for this purpose.

After the registration exchange, a state server learns about other state servers and sends a bandwidth measurement message to those servers, thus measuring the network proximity. Depending on the number of servers in the State OS, a state server may elect a group leader based on available bandwidth and processing power.

A state server then creates a signaling connection to other state servers directly or through their group leader. This connection is maintained through the life of the server. Since state servers are expected to have the same time of day clock, they get the current time from third party sources like active directory servers. This time is used for time calculations instead of relying on the local clock. State servers can now start other State OS components like gateway applications. For example, a media server would start RTSP servers for distributing media. At this point a state server is operational and clients can start connecting to the server.

State Server Operation

Once initialization is complete a state server starts its primary tasks of communicating with clients and other state servers. Clients connect to the core OS module to complete registration and then invoke API functions for the applications it is interested in. Each client connect is identified by the user name of the client and the machine identity. This information is useful for presence based applications like a chat/message application.

The connected clients and gateway applications running on the state servers request data for business objects. To locate the data, a state server first consults its cache to see if the requested data is stored locally. If it is available locally it can be served right away, otherwise a request is sent to other servers. This request is a message that lists the business object, timestamp and additional type specific information. This request is sent using the signaling connection.

Storage

While State OS software and Windows files are stored in the boot partition, State OS data files are stored in different partitions. State servers are expected to have multiple high capacity drives. These can be either traditional magnetic disks or solid state disk devices, though the magnetic disks are expected to be used most of the times. These disks are partitioned using GUID partition table (GPT) to have number of partitions as configured. Each disk partition is expected to be a raw partition, meaning no Windows recognizable file system is stored there. This prevents Windows from mounting the disk partition and start file system operations.

The data partitions are not necessarily the same size. Their size and usage pattern are configurable, some partitions may be reserved for certain applications or business objects, depending on their size, priority, frequency of usage, frequency of change and other such parameters.

The data disks do not have any computer specific information stored in them, so they can be freely transported to another state server or taken offline as backup disks. Since state servers are expected to support dynamic disk insertion and removal, they can be transported without shutting the computer down. These disks can be cloned and sent to a newly installed state server thus saving network bandwidth costs in replicating data. When a disk is pulled out, State OS is notified by Windows operating system, which then invalidates STUs and business object cache entries that refer to disk being removed.

Security

State servers are integrated with an existing security infrastructure like Active Directory or other security infrastructure. In this implementation, state servers don't implement their own security infrastructure like users, groups and permissions. State servers are members of the enterprise active directory domain, so access to state servers can be controlled much like any other Windows server.

Clients connecting to state servers use the identity of the logged in user. Identity information is passed in transparently to the state server, so users of State UI don't need to enter their username and password to connect to state servers. Business objects stored in a state server are access controlled based on the client's identity, this access information can be modified by authorized users using State UI.

Metadata STU Handling

Metadata STUs need to be handled differently from data STUs. All state servers have identical copies of metadata STUs and any change needs to synchronized right away. Metadata STUs are read completely off the disk and sent to applications for recreating the business objects and the STUs are held in the cache. This cache is updated when new STUs are received from other state servers, and STUs from the cache can be sent to other state servers on demand. Metadata STUs are sent via the signaling connection, each state server maintains a signaling connection to other state servers or group leaders. Thus metadata STUs are tracked in a particular state server using a table similar to the one below.

TABLE 1

| STU Type | GUID | Timestamp | Disk Offset | MemoryStorage |
|---|---|---|---|---|
| 2 | { xxxx-yyyy } | x seconds | 34000 | { Blob } |
| 2 | { aaaa-bbbb } | y seconds | 40000 | empty |

In this table, some STUs may store the data portion of the STU (the actual metadata) in memory, thus saving access to disk. This table may have additional parameters depending on the type of application and business object.

Data STU Handling

Data STUs are different from metadata STUs in the sense the data is seldom stored in memory, it is left in the disk and only the disk offset is stored in the STU cache. The data STUs are not synchronized automatically. Data STUs are typically transferred on a data channel (not the signaling channel) which is established on demand. Data STUs are tracked using a table similar to the one used for metadata STUs. These tables are structured differently for different business objects. For example, media frame data STUs are tracked using the following table.

Data STU tables are maintained by applications, which would typically use additional application specific information to keep track of STUs. For example, media frame STUs are tracked using a time offset from the beginning of a movie, play duration of the constituent STUs and movie stream id (which specifies if it is an audio stream or video stream). This table is used to locate STUs corresponding to a given media time offset and duration; absence of an entry in this table would mean STUs for that media time offset are not locally available. Thus a media business object is not directly mapped to STUs, it is mapped indirectly using time offset and duration, there is no direct mapping that lists all STUs related to a media business object. It is worth remembering that the media metadata has information like play duration and stream identifiers which would help in translating time offsets to STU locations.

When STUs in disk are overwritten, this table is modified to reflect the absence of those STUs by deleting the corresponding entries.

TABLE 2

| GUID | Timestamp | Start Time | Duration | Disk Offset | Stream Id |
|---|---|---|---|---|---|
| { xxxx-yyyy } | x seconds | 100 | 33 | 34000 | 2 |
| { xxxx-yyyy } | y seconds | 133 | 66 | 40000 | 2 |

Since data STUs are transferred on the data channel, a multicast path needs to be established from the source to all the receivers. The source and receivers are identified by broadcasting data discovery message where a state server requests data STUs of certain kind on the signaling channel. This message is received by other server which then replies if they have those STUs or if they want those STUs. Form this information the source and receivers are identified, and the source sends a path establishment message connecting itself with all the receiver, once the path establishment is complete data transfer begins.

Case Study—Media Server

A further understanding of the invention may be had by considering a Media Server application using a State OS and storage according to specific embodiments of the invention. Media may be described as a business object that exhibits an audio visual experience. Examples of media include video, audio, photo, slide show, screen shot of a computer application and status monitor displays. Media can also be described as a presentation that is generally not interactive. For example, a CEO address to employees may be presented live, but by itself it is not interactive, whereas a user playing a video game is interactive. A media presentation is generally continuous running from start to end; it may be paused in the middle or fast forward or reversed. A Media Server is a device or system to store media and is able to stream media data to media players on demand. One user uploads media to the server and many users can view it through a media player.

A movie is a media business object that can be understood to have three components (1) metadata, which is a collection of name value pairs including data about the movie file and data about the movie, (2) video frames and (3) audio samples. A video frame is just a rectangle of the specified width and height, with pixel as unit of length. For example, a 1080p video has 1920 columns and 1080 rows with each pixel having a 32 bit color value. For movie data, video frames are generally organized as video clips, each clip generally comprising a key frame and a number of difference frames. Each video frame or video clip has a presentation time which is number of milliseconds from the beginning of the movie and the duration in milliseconds that the frame is valid for. An audio sample is a digitized sound value also with a presentation time and duration.

Since a movie is a large object, it is traditionally stored as a file instead of storing it in a database. The file format used in storing a movie varies, the most common formats being Microsoft Windows Media (also known as ASF) and Apple QuickTime. In Windows Media, metadata is further classified into different categories and each category is stored in a specific format in the file, mostly in a binary format. In most cases, the video frames and audio samples are either combined or divided into fixed size packets and stored in a specific binary format. Apple QuickTime has a similar file format. Storing a movie as a single file can create a large file; a Blu-Ray movie on an average has a size of 25 GB. It is difficult to manage such a large file, a file system doesn't have the ability to divide this into smaller units or merge smaller units into a large file. And since a file is just an array of bytes, it is difficult to read video metadata from the file without using special applications, and it is also difficult to modify or add metadata.

In a State OS, according to specific embodiments of the invention, business objects are stored closer to their natural format. Thus, it is desired in the invention to decompose movies into manageable, self-identified units, and create an easy mechanism to add/delete/modify values.

The metadata of a movie are generally best stored as an XML fragment or some other data format that supports hierarchy, is easy to manage and is supported by a wide array of programming tools.

Figure 8E:
Figure 8E:
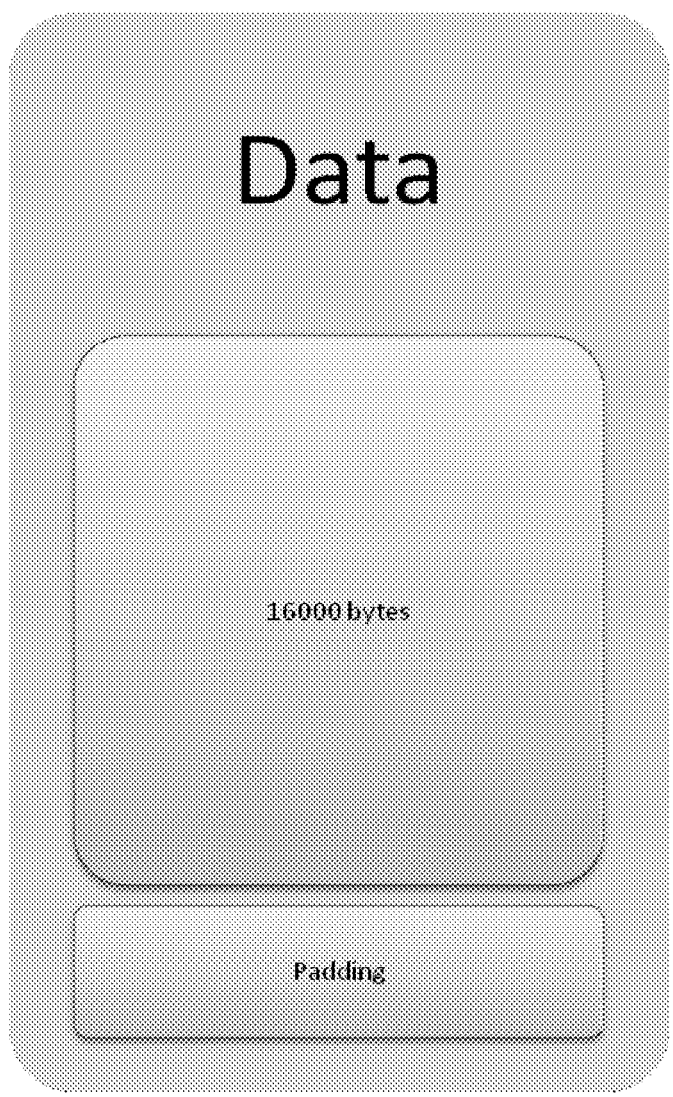

FIG. 8A-E are diagrams and XML code illustrating a movie business object according to specific embodiments of the present invention. FIG. 8A shows a XML fragment representing a technical video. The XML contains values for fields like title, description and creation date. This metadata can contain information gathered from the original video file plus other information entered by the user who uploaded this video. In state operating system a business object is identified by a unique id called GUID, it is a 16 byte binary value usually represented in the format "229c72d1-1573-4101-9a61-b58652b07cc9". A movie has only one metadata unit, so there is no need to uniquely identify it among other possible metadata units.

Both video frames and audio samples are represented as binary data. Each of them is uniquely identified by stream id and starting time. Both audio and video have the same binary structure and each one has a unique stream id. The stream id in this example is identified as 'Index' in the 'Stream' tag.

A movie can also be understood as decomposed into 2 types of units (1) metadata and (2) media data. When a movie is stored in state operating system, the metadata is stored as one STU, each video frame or clip is stored as an STU and each audio sample is stored as an STU. Thus, these STUs are independent, and they don't have to be stored in any order. In fact these STUs can be split across servers in an enterprise, the server that is streaming the movie can get these STUs from local storage or from other servers.

For simplicity of description, assume all the STUs are stored locally and together in which case the storage will be pictorially represented as shown in FIG. 8B. An example metadata STU is shown in FIG. 8C. In this case, the data portion of this STU is actually a command that inserts a XML fragment into the metadata business object for the movie. A sample of such a command is show in FIG. 8D. Because metadata can be modified by users, its changes are tracked. In this case, this STU being the first in the list of metadata STUs adds metadata to an empty object. If a user modified a field in this metadata, a new STU would be added to the list of STUs associated with this object ID.

Because a video contains multiple video frames and audio samples, each frame data STU needs to be uniquely identified. Thus these STUs are structured as shown in FIG. 8E. Similar STUs are created for each video frame and audio sample. Thus, a media business object is decomposed into two types of STUs, satisfying the goals we mentioned earlier.

As an example, when a user uploads a video, generally a State UI application is invoked and provides a GUI that lets a user upload a video file (for example, a Windows Media file) and enter additional information about the video. This State UI communicates with a state server using State API. The State UI invokes the media upload function of State API and sends the file data over a TCP connection to the server. The server, when it receives the complete file, parses the file and pulls the metadata and each video frame and audio sample. This metadata from the file is combined with the information user entered in State UI to get an XML document. Now one metadata STU is created and saved to disk.

For each video frame and audio sample an STU is created and saved in disk. The metadata is saved in cache, and the saved copy of metadata may not be read again until the server restarts. For frame data STUs, the start time, duration, stream ID, object ID, disk location of this STU are stored in cache. The complete STU would only be accessed from disk when it is requested by the user or other servers in the state operating system.

As a further illustrative example, when a state server restarts (and to simplify the discussion assume there is no other server in the state operating system), it scans through all the STUs in the disk and builds a STU cache based on STU type, timestamp and preceding timestamp. As it starts handing off STUs to applications, assume it finds a media metadata STU and passes it to the media server application. The media server now extracts the XML commands from it. At this point it doesn't know anything about this video business object, so it creates a new video business object in memory cache and adds the metadata to it. It then gets the frame data STU; extracts the disk location of the data, the stream ID and start time and adds it to the video business object created earlier. The server doesn't read the data portion of this STU. This continues until all other STUs related to this object are read from disk. According to specific embodiments of the invention, GUIDs are created when a business object is created, in this case when media is upload by an user. In an example embodiment, GUIDs can use various standard methods to create unique ids based on current time, network address and other transient parameters that make the ID unique.

When a user plays this video using Windows Media Player, the state server runs a RTSP based streaming server application. This RTSP server runs in the same machine that runs the rest of state server software. Its job is to listen for RTSP connections and server media streams to the requesting users. When Windows Media Player connects to RTSP server, it first requests the metadata. To handle this request, the RTSP server reads metadata from the server cache, then converts it to a standard format and sends it over to the media player. The media player now starts the play and expects video frames and audio samples one by one. For this, the RTSP server reads STUs from disk or receives them over the state OS from other state servers, converts them to the RTSP payload format and sends it the media player.

Playlists and Channels

Playlist and Channel business objects according to specific embodiments of the invention allow a media player to locate videos. To clarify that, we need to introduce playlists and channels. Much like a TV is tuned to a TV channel, a media player points to the URL associated with a media channel. Channels are generally named after departments, users, conference rooms and such. For example, the RTSP URL for the finance channel could be, rtspu://mediaserver1.contoso.com/finance. By default, resources like users and conference room get their own channel, this means a media player under a logged in user doesn't have to specify their URL, the server identifies the connection and automatically switches to that channel.

Thus, channel is a named identifier that has playlists attached to it. A playlist is a collection of media clips; each clip specified the media id, start time and end time. A playlist can have just one clip, that is a media from beginning to end or it can have a collection of small clips. Both playlists and channels are created by users using State UI.

Figures 9C, 9D:
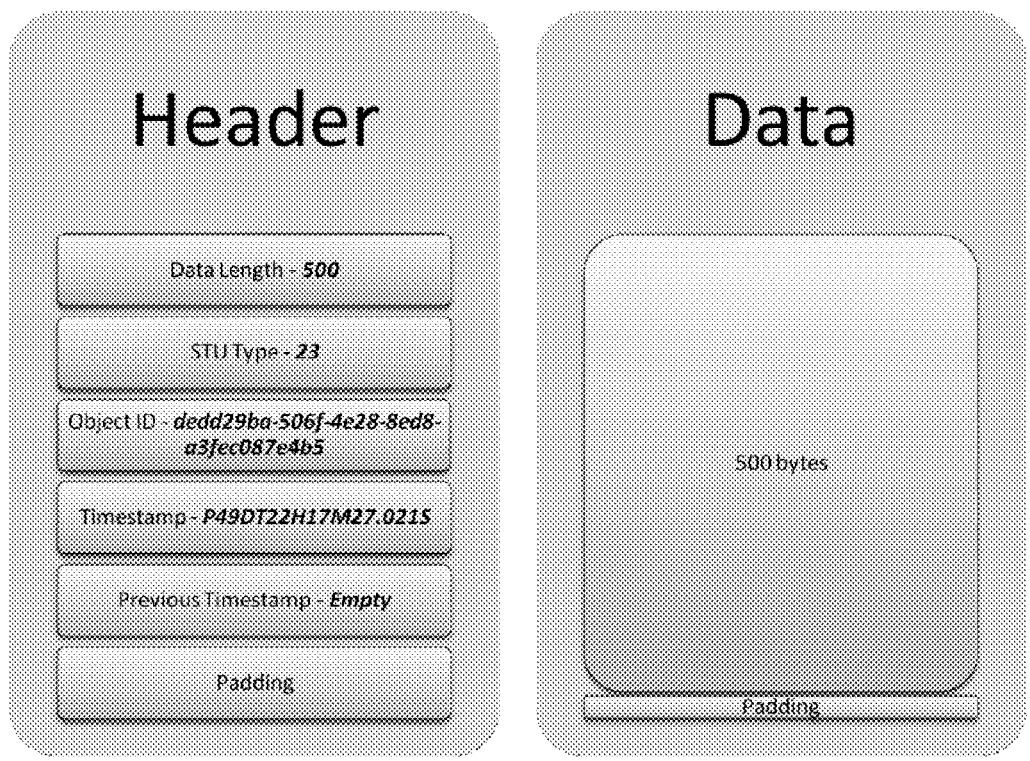
Figure 10:
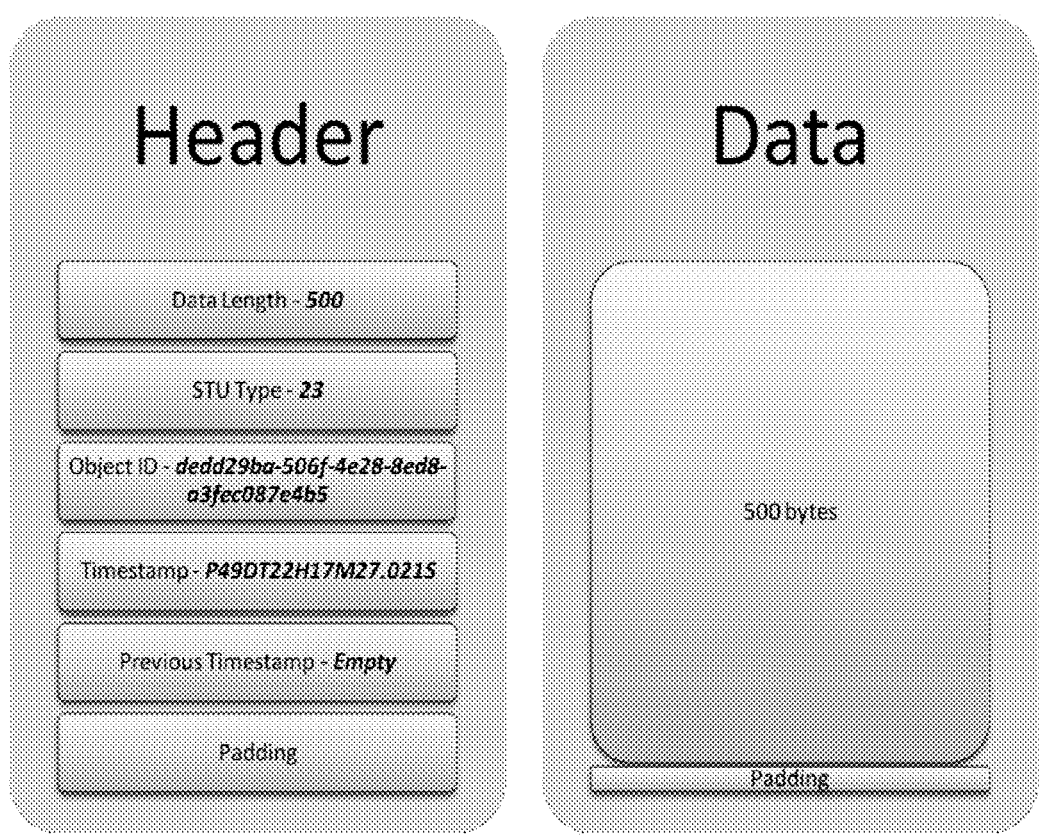
FIG. 10 is a diagram and XML code illustrating an order business object according to specific embodiments of the present invention.
Figure 11:
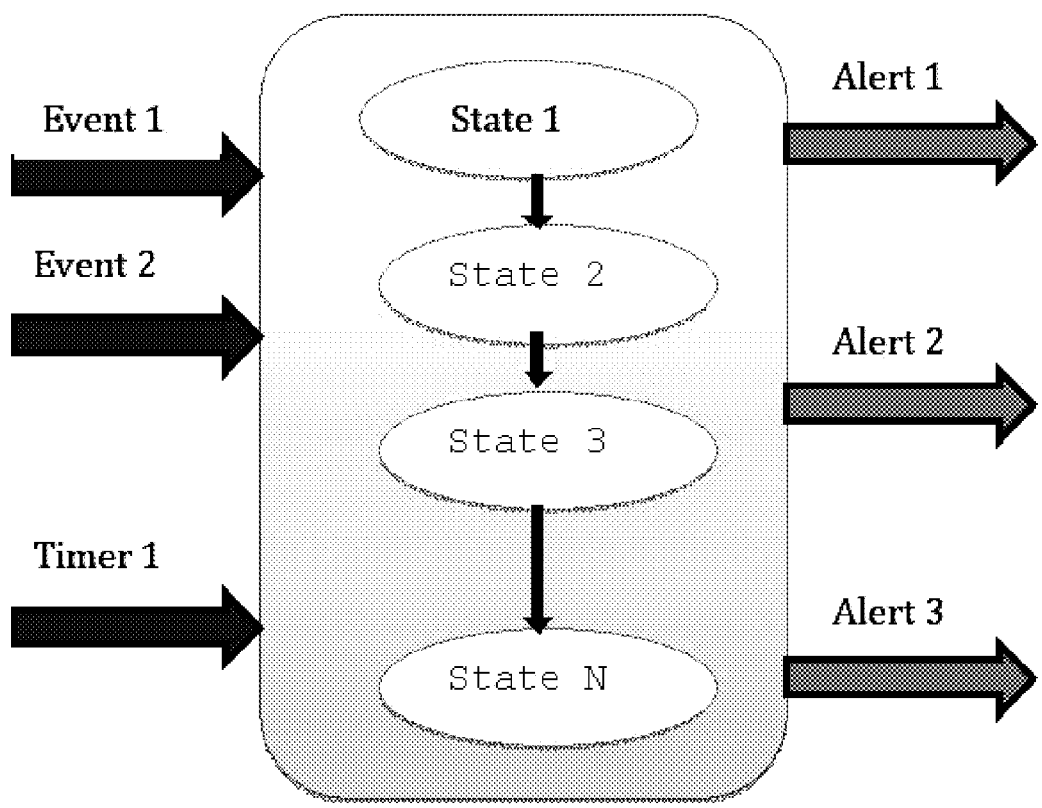
FIG. 11 is a block diagram illustrating events and alerts according to specific embodiments of the present invention.

Playlists and Channels are two additional STU types in a State OS according to specific embodiments of the invention. A playlist may be best represented as a XML fragment, thus follow the similar structure as media metadata. FIG. 9A-D are diagrams and XML code illustrating a playlist and a channel business object according to specific embodiments of the present invention. FIG. 9A illustrates a sample STU data for a playlist STU. This XML fragment specifies a command to create a new playlist business object with the id as "dedd29ba-506f-4e28-8ed8-a3fec087e4b5". This playlist contains three clips, each clip specifying the id of the media it is referencing, start and end time offset in the media. The playlist has a descriptive name and each clip has its own descriptive name. If the name is empty, it would take the title of the media as its name. So if this playlist is added to a channel and streamed to a media player, it would play the three clips in the specified order.

Changes in this playlist are stored as additional STUs. FIG. 9B illustrates a change STU that removes the third clip and modifies the end time of the second clip to 2000 milliseconds.

FIG. 9C illustrates the binary structure of a playlist STU. As in other STUs the header and data are padding to 512 byte boundaries.

A channel is structured similar to a playlist, represented as a XML fragment. FIG. 9D is a sample channel that is coded as the data portion of a channel STU. As indicated in the XML fragment, a channel has a name and one or more playlists. A channel refers to playlists using the ID of a playlist. A channel can be configured as either 'Live' or 'On Demand'. Live channels includes an absolute starting time, two players playing a live channel would see identical screens. Whereas a on demand channel starts from the beginning whenever it is played, so two players playing the same on demand channel would see different screens depending on when they started playing. The STU structure of a channel STU is similar to a playlist STU, except for the STU type.

Embodiment in a Programmed Information Appliance

FIG. 12 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 12 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Other Embodiments

Although only a few embodiments have been disclosed in detail above, other embodiments are possible and the inventor intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a server. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium, or other removable medium. The programs may also be run over a network, for example, with a server or other machine sending signals to the local machine, which allows the local machine to carry out the operations described herein.

What is claimed:

1. A method of storing and retrieving digital data comprising:
    converting the digital data into one or more state transformation units (STUs);
    wherein an STU is read-only, of a variable size, and creates, modifies, or adds data added to a business object;
    storing state transformation units on a storage medium;
    retrieving a business object by reading and applying state transformation units associated with that business object; and further wherein STU's are characterized by one or more of the following:
    STUs are unmodifiable;
    STUs are self-identified where each STU has identifying information comprising a business object GUID to which that STU pertains and a timestamp;
    STUs can be copied anywhere in a linked distributed storage system without needing to synchronize data;
    STUs are independent in that one STU does not become a part of another STU;
    STUs are independent in that there is no dependency hierarchy for STU's.

2. The method of claim 1 further comprising:
    assigning each business object a globally unique identifier (GUID).

3. The method of claim 1 further wherein STU's are characterized by two or more of:
    STU are unmodifiable;
    STUs are self-identified where each STU has identifying information comprising a business object GUID to which that STU pertains and a timestamp;
    STUs can be coped anywhere in a linked distributed storage system without needing to synchronize data;
    STUs are independent in that one STU does not become a part of another STU;
    STUs are independent in that there is no dependency hierarchy for STU's.

4. The method of claim 1 further wherein:
    STUs have a structure with a predefined format comprising a header of a determined length and a variable length body;
    the header includes data indicating one or more of:
        STU type;
        STU business object's GUID;
        STU time stamp;
        preceding STU timestamp;
        identification of STU creator;
        STU data portion size; and
        additional type specific information.

5. The method of claim 1 further comprising:
    recreating a business object by processing its associated STUs, one after another wherein each STU specifies the preceding timestamp of the preceding STU for which it is applying a change.

6. The method of claim 1 further comprising:
    creating a new summary STU to summarize and replace one or more other STUs preceding it, and providing the summary STU a preceding timestamp that reflects the STU that precedes all the summary STUs or no timestamp for an STU that summarizes all state changes to a business object.

7. A system for data storage comprising:
    a State OS comprising a suite of distributed logic routines, said logic routines stored in computer memory;
    a plurality of state servers each executing the State OS on one or more computer logic processors;

the suite of distributed logic routines comprising:
- software to compose and decompose business objects into STUs;
- software to store STUs;
- software to transmit and receive STUs to and from associated state servers;
- software implementing APIs used to access the business objects;
- software to synchronize the state of one state server with other state servers; and further wherein STU's are characterized by one or more of the following:
- STUs are unmodifiable;
- STUs are self-identified where each STU has identifying information comprising a business object GUID to which that STU pertains and a timestamp;
- STUs can be copied anywhere in a linked distributed storage system without needing to synchronize data;
- STUs are independent in that one STU does not become a part of another STU;
- STUs are independent in that there is no dependency hierarchy for STU's.

8. The system of claim 7 further wherein:
each state server is symmetrical and there is no centralized data center;
the plurality of state servers is architected to run as a single virtual device, referred to as the State OS, and users or clients connected to any one state server have access to the entire State OS as though the operating system were a single device.

9. The system of claim 7 further wherein:
users access the State OS as a single unit without regard to the number or distribution of state servers.

10. The system of claim 7 further comprising:
at least one state server that runs on a single hardware device; and
at least one state server software instance that runs multiple hardware devices connected to a local high speed network;
at least two instances of state server software running on a single hardware device.

11. The system of claim 7 further comprising:
at least one state server that runs on a hardware device comprising:
- more than about 16 gigabytes of RAM;
- more than about 8 cores of CPU;
- more than about 5 terabytes of non-volatile storage;
- at least one high speed network adapter.

12. The system of claim 7 further comprising:
at least one state server located close to users, away from a central location like a data center.

13. The system of claim 7 further comprising:
at least one state server located physically and/or logically near network switches.

14. The system of claim 7 further wherein:
a state server enterprise system comprises between about 5 to 20 individual state servers.

15. The system of claim 7 further wherein:
a state server enterprise system comprises more than about 100 state servers.

16. The system of claim 7 further wherein:
state servers are synchronized such that each state server is connected to every other state server either directly or indirectly through other state servers;
state servers are connected via at least two communication protocols:
a signaling connection optimized for sending short messages;
a data connection optimized for sending large amounts of data;
and further wherein state servers synchronize metadata about business objects, information about the network, client information, operating parameters of each server so that each server has the same picture of the complete State OS;
further wherein state servers do not synchronize the actual data of business objects.

17. The system of claim 7 further wherein:
state servers have at least two distinct logical interfaces:
state servers connect to other state servers to communicate information and data of STUs, which are never sent to clients; and
state servers connect to clients wherein the client to state server interface handles business objects.

18. The system of claim 7 further wherein:
each state server runs the same suite of a State OS software under the same version and State OS software deployed to one state server is automatically copied to other state servers;
some state servers may run additional related software, such as software to ensure long term data storage.

19. The system of claim 7 further wherein:
state servers function in ways analogous to a network router by transparently transporting data from one server to another in response to system or user requests;
state servers are generally invisible to end users;
state servers are easy to deploy, supporting effectively drop-in installation.

20. The system of claim 7 further comprising:
one or more applications designed to run on the State OS;
the applications comprising one or more selected from the group:
a media server application;
wherein the media server application hosts digital media (like video), streams video to users, optionally allows users upload media files in known formats (like a windows media file) and lets any user to play the video using standard media player (like Windows Media Player);
an ordering system application comprising three modules: (1) a workflow module runs on each state server to compose and decompose order data into STUs, create and manage various tasks for billing, shipping and other departments; (2) a gateway module able to convert ordering information to web pages, accepting orders from users, which runs independent of state servers, using state API; (3) a UI module that runs on PCs and mobile devices to allow internal users to manage tasks related to the order and that executes on top of State UI.

21. A non-transitory computer readable medium containing computer interpretable instructions that when loaded into an appropriately configured information processing device will cause the device to embody the system of claim 7.

* * * * *